United States Patent
Deimen et al.

(10) Patent No.: US 9,045,062 B2
(45) Date of Patent: Jun. 2, 2015

(54) REVERSIBLE AIRLINE SEAT

(71) Applicant: ZODIAC SEATS US LLC, Gainesville, TX (US)

(72) Inventors: Michael L. Deimen, Jasper, IN (US); Raul Daniel Flores Aguirre, Chihuahua (MX); Jose Madrigal, Chihuahua (MX); Oscar Ruiz, Chihuahua (MX)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 14/081,006

(22) Filed: Nov. 15, 2013

(65) Prior Publication Data

US 2014/0138991 A1 May 22, 2014

Related U.S. Application Data

(60) Provisional application No. 61/727,242, filed on Nov. 16, 2012.

(51) Int. Cl.
*B60N 2/10* (2006.01)
*B60N 2/24* (2006.01)
*B60N 2/20* (2006.01)
*B64D 11/06* (2006.01)

(52) U.S. Cl.
CPC ............... *B60N 2/203* (2013.01); *B64D 11/06* (2013.01); *B64D 11/0638* (2014.12); *B64D 11/064* (2014.12); *B64D 11/0601* (2014.12)

(58) Field of Classification Search
USPC .................................................. 297/94–104
See application file for complete search history.

(56) References Cited

U.S. PATENT DOCUMENTS

| | | | | |
|---|---|---|---|---|
| 572,655 A * | 12/1896 | Hale | ................. | 297/96 |
| 580,576 A * | 4/1897 | Hale | ............ | 297/96 X |
| 613,423 A * | 11/1898 | Pickles | ............ | 297/96 |
| 639,894 A * | 12/1899 | Gibbs | ............ | 297/96 X |
| 691,373 A * | 1/1902 | Hale | ............ | 297/96 X |
| 784,429 A * | 3/1905 | Pickles | ............ | 297/96 |
| 795,501 A * | 7/1905 | Fassett | ............ | 297/101 |
| 842,298 A * | 1/1907 | Budd et al. | ............ | 297/96 |
| 879,730 A * | 2/1908 | Budd | ............ | 297/96 |
| 1,140,097 A * | 5/1915 | Anger | ............ | 297/96 |
| 1,140,342 A * | 5/1915 | Anger | ............ | 297/96 |
| 1,301,019 A * | 4/1919 | Walker | ............ | 297/97 |
| 1,301,020 A * | 4/1919 | Walker | ............ | 297/97 |
| 1,360,966 A * | 11/1920 | Marsh | ............ | 297/96 |
| 1,412,139 A * | 4/1922 | Schechter | ............ | 297/101 |
| 1,564,401 A * | 12/1925 | Bell | ............ | 297/96 |
| 3,165,350 A * | 1/1965 | Willson | ............ | 297/101 X |
| 3,265,435 A * | 8/1966 | Bilancia | ............ | 297/101 |
| 3,471,195 A * | 10/1969 | Rowe | ............ | 297/101 |

(Continued)

*Primary Examiner* — Rodney B White
(74) *Attorney, Agent, or Firm* — Kilpatrick Townsend and Stockton LLP

(57) ABSTRACT

A passenger seat is provided that utilizes existing standard pitch dimensions for multiple seating classes, in combination with a proprietary reconfiguration mechanism that allows passengers to maintain an acceptable knee clearance regardless of the seat's orientation. According to some embodiments, a passenger seat may reverse position of the backrest in a way that maintains passenger density (number of passengers per class), while providing appropriate levels of comfort and respect for current social norms related to personal space. In some embodiments, a reversible tray table is provided for use with the reversible seat. In some embodiments, the tray table may couple with an adjacent tray table with engagement features.

15 Claims, 17 Drawing Sheets

(56) References Cited

U.S. PATENT DOCUMENTS

| | | | | |
|---|---|---|---|---|
| 3,877,746 | A | * | 4/1975 | Christine et al. ............... 297/95 |
| 4,081,051 | A | * | 3/1978 | Logsdon .................... 297/94 X |
| 4,322,052 | A | * | 3/1982 | Hodge et al. ............... 297/94 X |
| 5,076,640 | A | * | 12/1991 | Bulte .......................... 297/101 |
| 5,149,171 | A | * | 9/1992 | Gilevich et al. ................ 297/94 |
| 5,322,341 | A | * | 6/1994 | Harrison et al. ............... 297/94 |
| 6,715,825 | B2 | * | 4/2004 | Tame .............................. 297/94 |
| 6,719,366 | B2 | * | 4/2004 | Lane ............................... 297/95 |
| 2008/0290700 | A1 | * | 11/2008 | Paluch ............................ 297/95 |

* cited by examiner

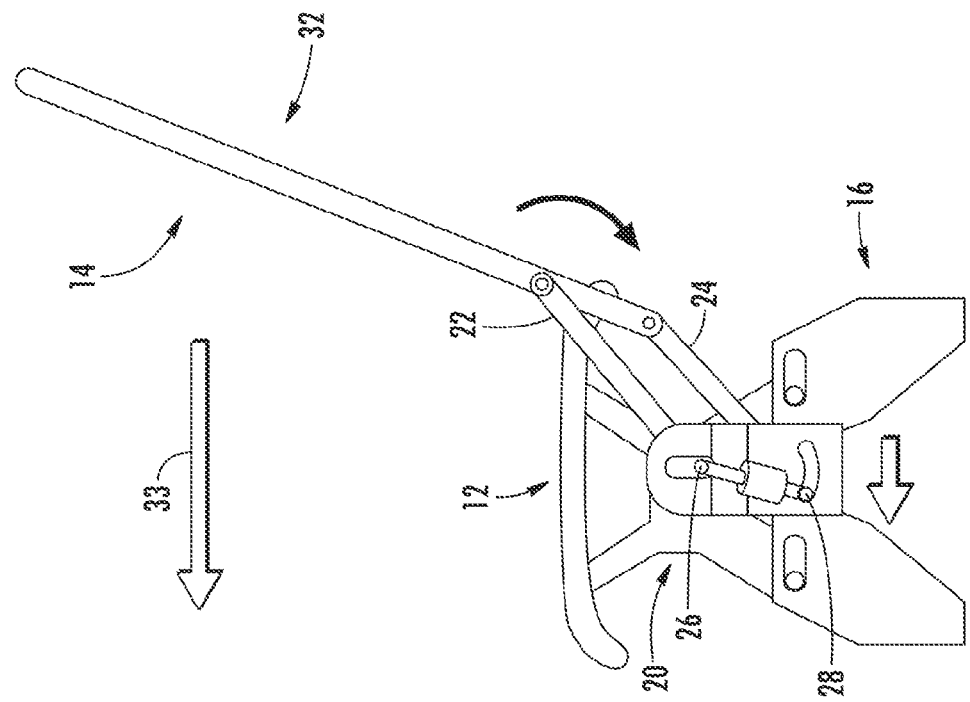
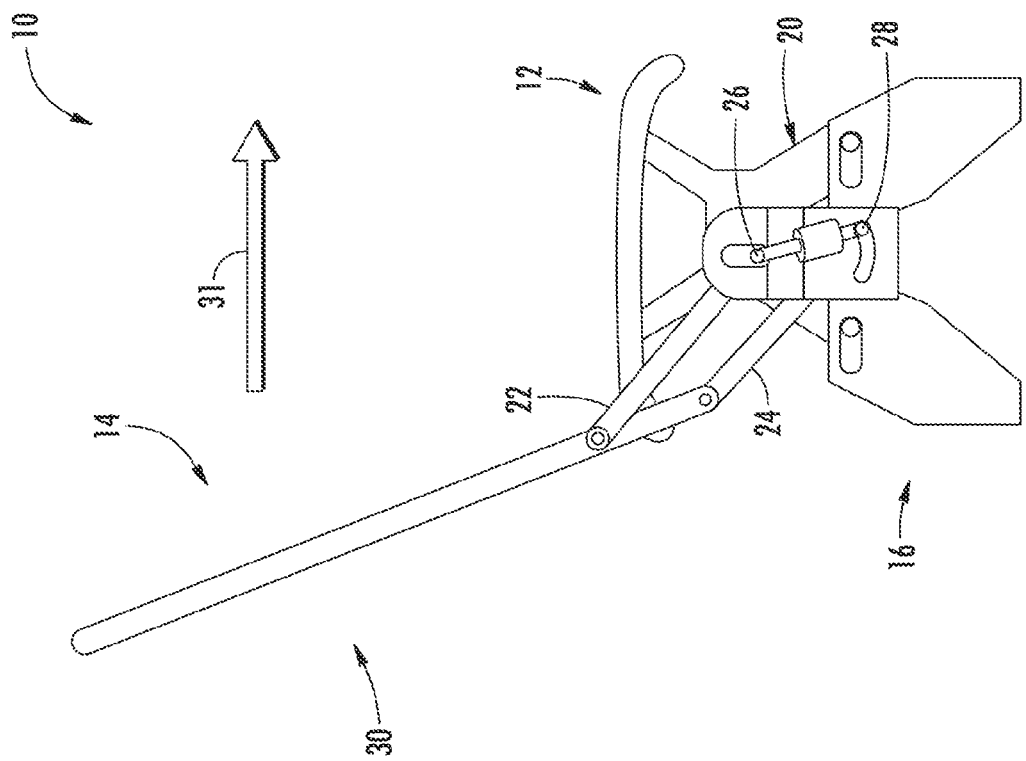

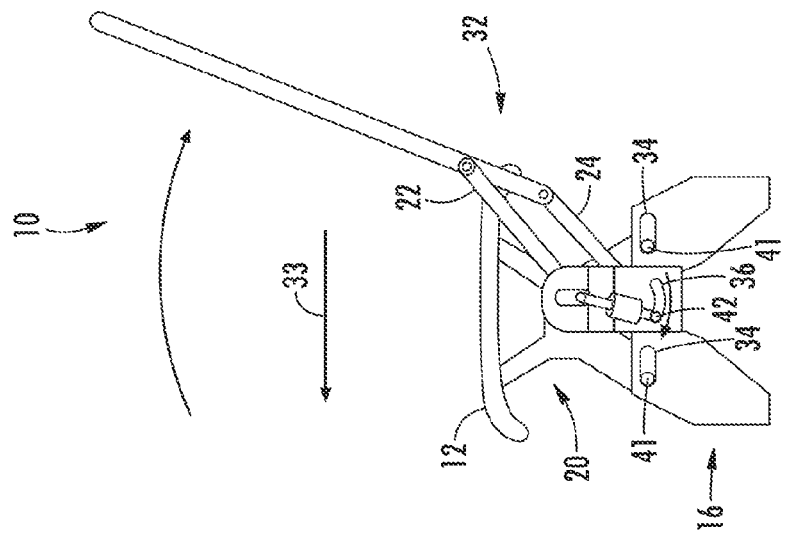
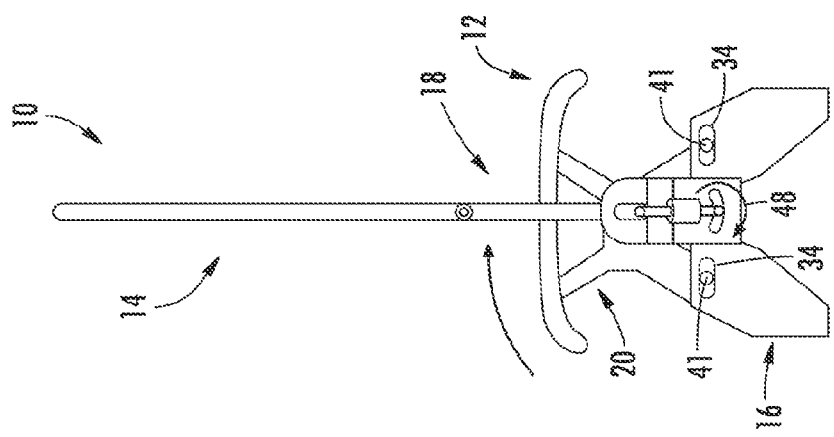
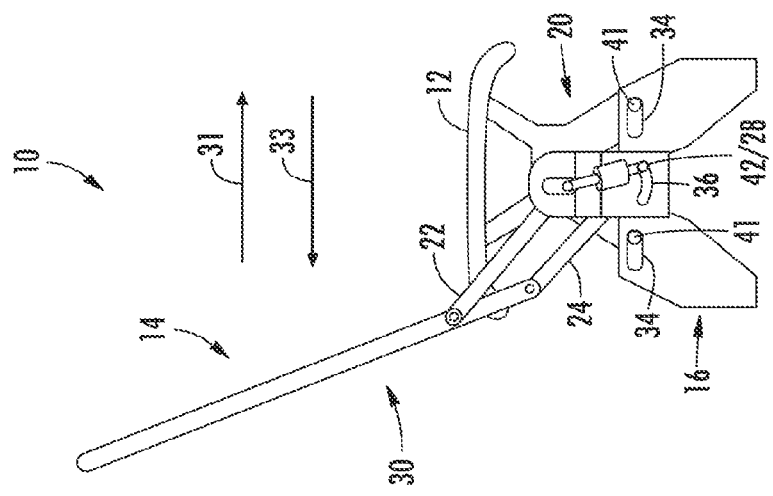

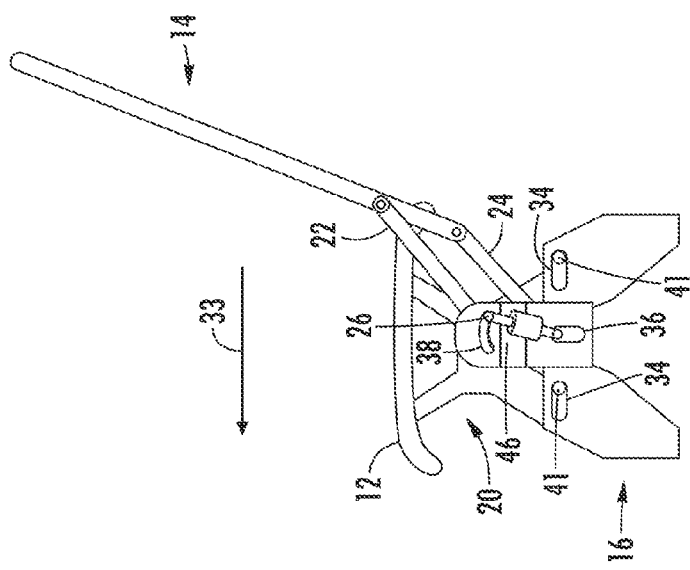
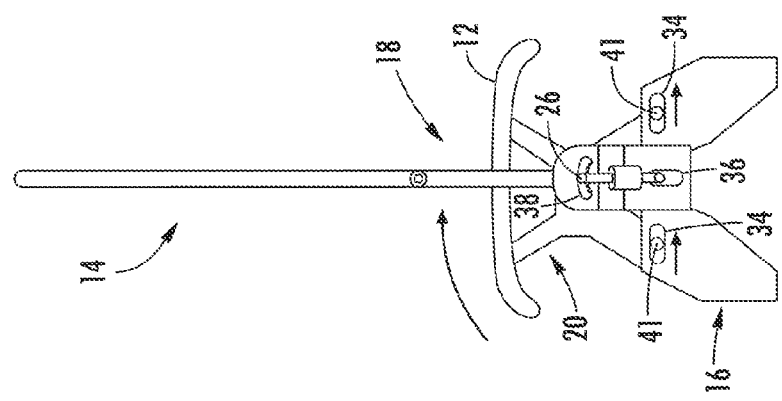
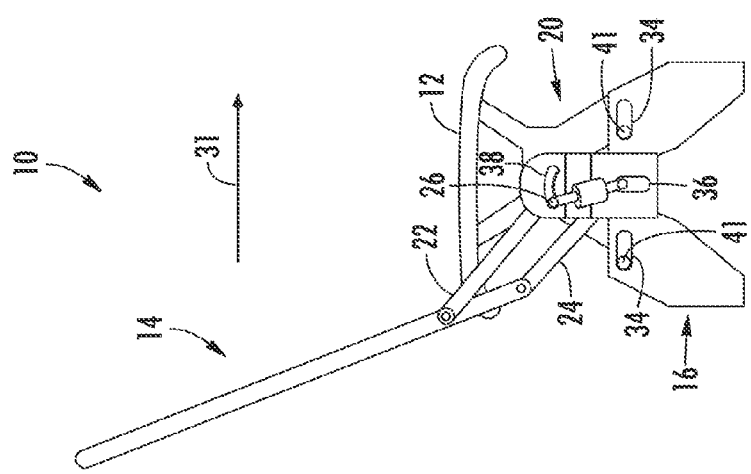

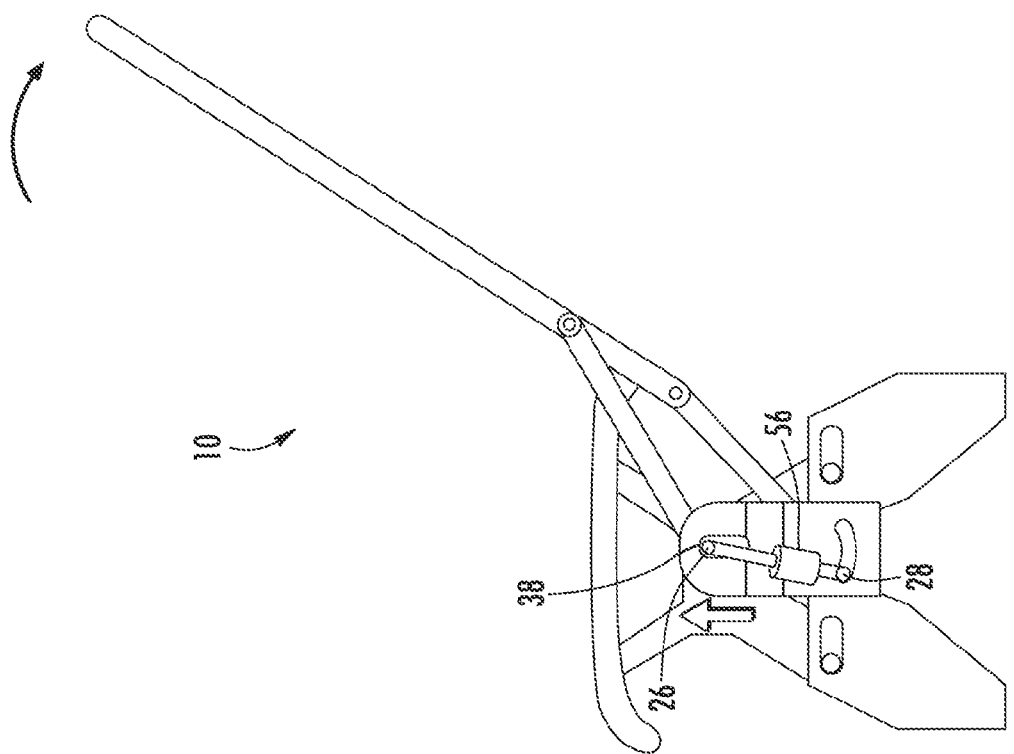
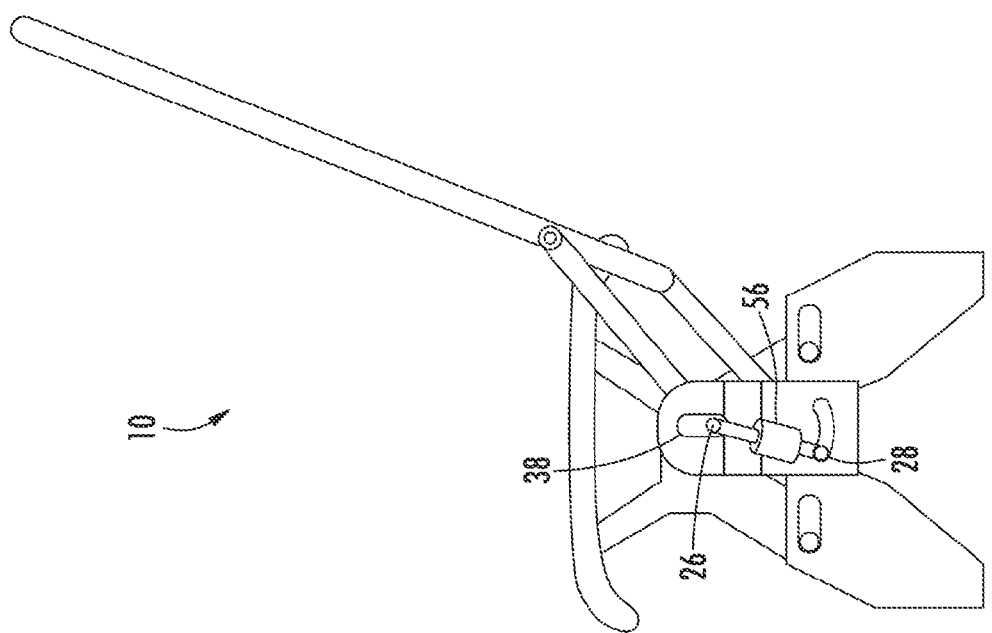

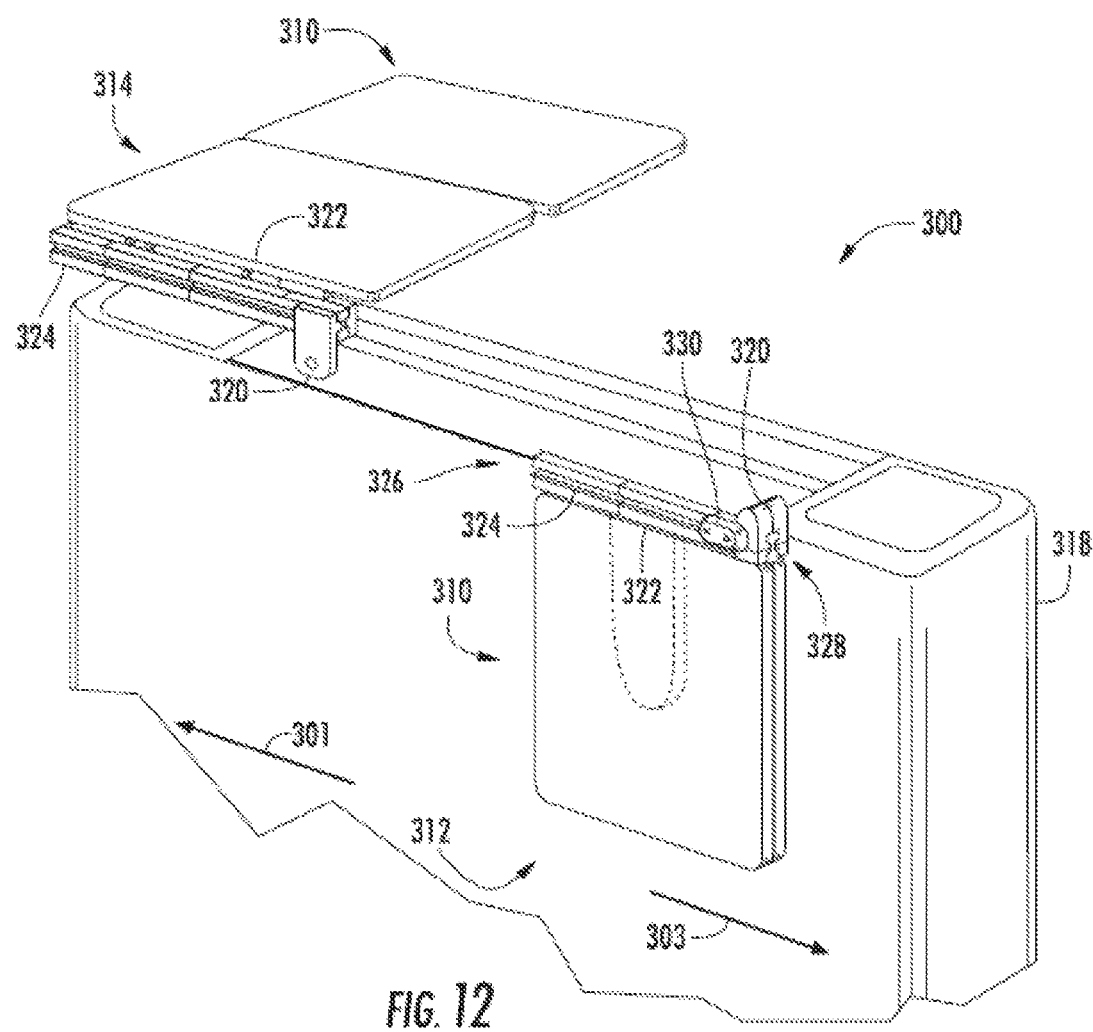
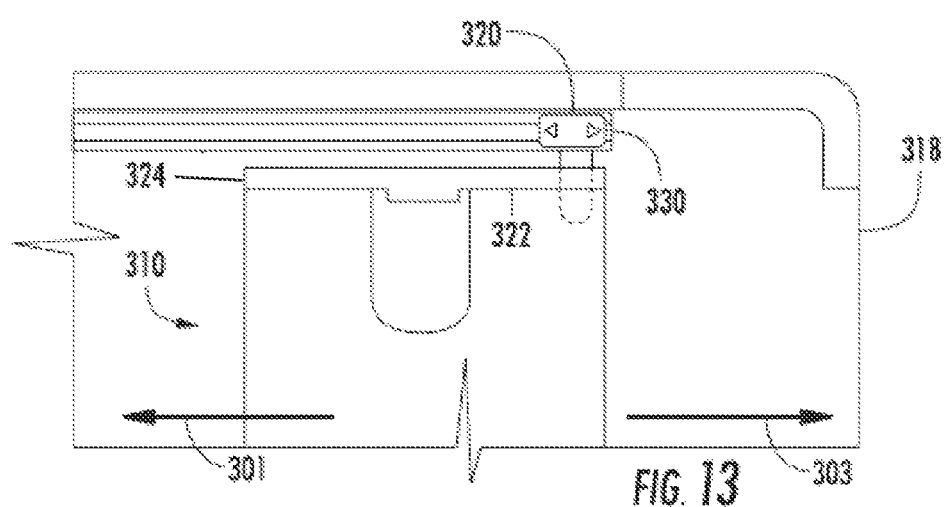

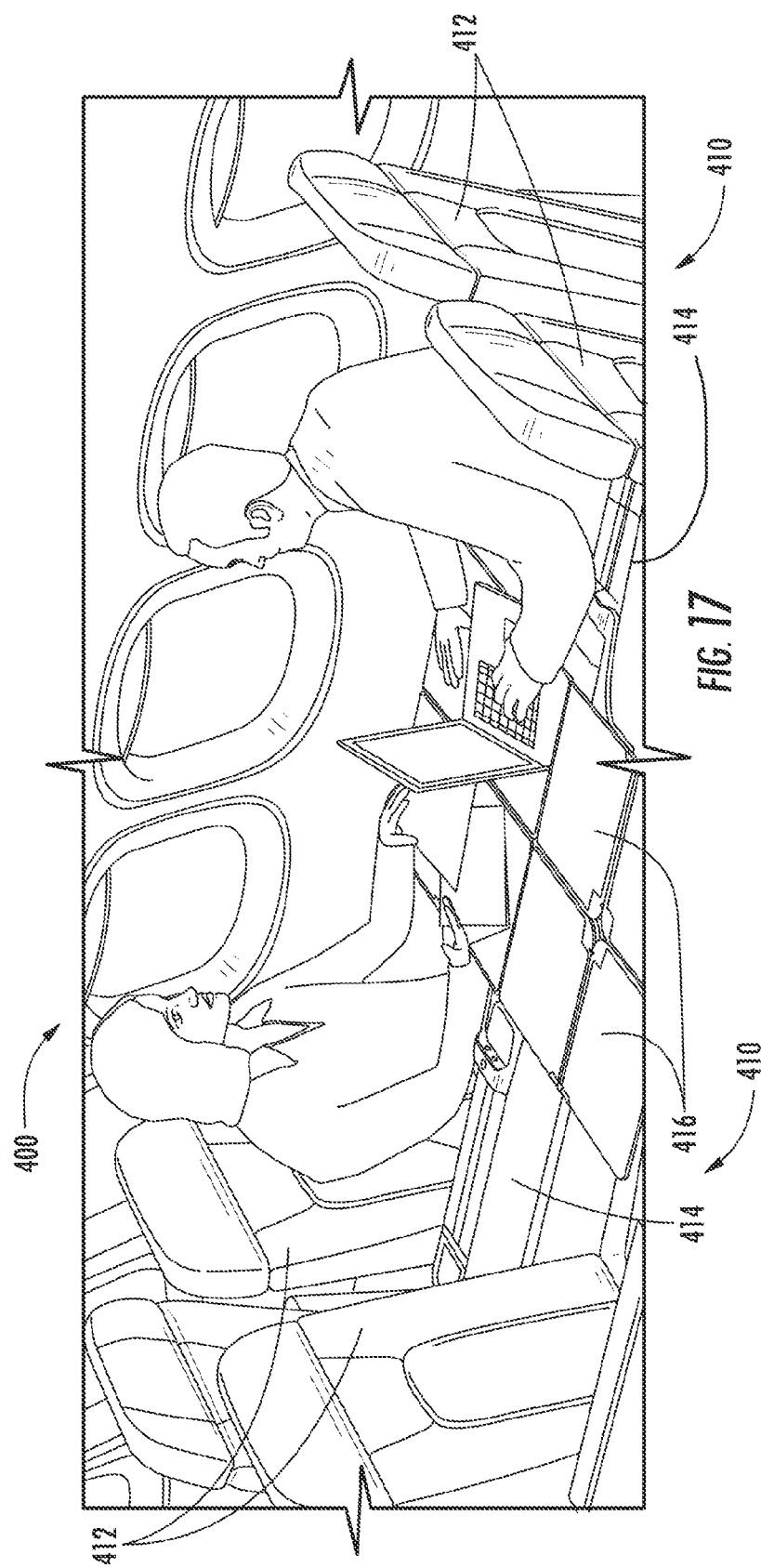

REVERSIBLE AIRLINE SEAT

CROSS REFERENCE TO RELATED APPLICATION

This application claims benefit of and priority to U.S. Provisional Application No. 61/727,242 filed on Nov. 16, 2012, the contents of which are incorporated herein by this reference.

BACKGROUND OF THE INVENTION

The present invention generally relates to aircraft passenger seats. More specifically, embodiments of the present invention relate to systems, methods, and apparatuses for reorienting and/or reconfiguring a certified aircraft seat.

Passenger aircraft cabins are traditionally designed such that most passenger seats are arranged and fixed in a forward facing orientation (i.e., facing the direction of travel). Thus, passengers, whether traveling individually or in groups are seated facing forward and viewing the back of the seat directly in front of them. In such an seating arrangement, most passengers spend the duration of the flight in individual activities and rarely in collective or collaborative pursuits. For example, many passengers may spend the duration of the flight time sleeping, reading, watching videos, or playing games by themselves. Even when passengers travel in groups of two or more, conversation can be difficult because the forward facing seats make face-to-face discussions difficult. Further, passengers traveling in larger groups may be split between multiple rows of a passenger aircraft, thereby making conversations or meetings practically impossible between passengers seated in separate rows. Moreover, current U.S. Federal Aviation Administration regulations limit the ability for passengers to congregate in the aisles of the airplane during flight.

In light of the above, it would be desirable to provide improved systems, methods and apparatuses for reorienting and/or reconfiguring a certified aircraft seat so as to facilitate group traveling. In particular, improvements can be made to provide for a passenger seat which may be reoriented from a forward facing seat to a rearward facing seat so that passengers in groups may face one another during travel.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In some embodiments, a reversible passenger seat is provided. The reversible passenger seat may include a seat bottom operably coupled with a seat backrest. The seat backrest may be moveable between a first position and a second position relative to the seat bottom. In some embodiments, the reversible passenger seat may be facing a first direction when the seat backrest is in the first position and facing a second direction when the seat backrest is in the second position—the first direction being opposite the second direction. In some embodiments, the seat bottom may be operably coupled with the seat backrest such that translational movement of the seat bottom in the first and second direction actuates the seat backrest between the first and the second positions.

Optionally, the seat bottom may be operably coupled with the seat backrest such that translational movement in the first direction moves seat backrest toward the first position and translational movement of the seat bottom in the second direction moves the seat backrest toward the second position. In some embodiments, the reversible passenger seat may further include a seat base frame for supporting the reversible passenger seat above a surface. The seat bottom may be slideably coupled with the seat base frame such that the seat bottom may be moveable relative to the seat base frame in the first direction and the second direction.

In some embodiments, the seat base frame may be coupled with the surface via tracks. The seat base frame may be moveable in the first direction or the second direction along the tracks so as to adjust a pitch between the reversible passenger seat and another seat. Accordingly, leg room between the two seats may be adjusted depending on whether the reversible seat is in the first orientation or the second orientation.

The seat bottom may be slideably coupled with the seat base frame via with a seat spreader. The seat spreader may include one or more bearings that run along one or more channels in the seat base frame. The seat base frame may be coupled with the seat backrest through a linkage. The linkage may move the seat backrest between the first position and the second position relative to the seat base frame when the seat bottom moves in the first direction and the second direction. In some embodiments, the linkage may include an upper link that couples with the seat base frame at an upper pivot. The upper pivot may be fixed at least in the first direction and the second direction.

In some embodiments, the upper pivot may be moveable in the vertical direction. Movement of the upper pivot in the vertical direction may adjust a reclining angle of the seat backrest. In some embodiments the upper pivot may run along a vertical channel in the seat base frame. Optionally, the linkage may further include a lower link. The lower link may be coupled with the seat base frame at a lower pivot. The lower pivot and the upper pivot may be coupled to one another with a piston and the piston may be actuateable so as to adjust a distance between the upper pivot and the lower pivot. The change distance between the upper pivot and the lower pivot may adjust the reclining angle of the seat backrest.

The linkage may include a lower link that couples with a geared piece having teeth. The geared piece may couple the lower link to the seat base frame and may run along a seat base frame channel having corresponding teeth. Movement of the geared piece through the channel may rotate the geared piece and rotation of the geared piece may thereby rotate the lower link and the seat backrest between the first position and the second position.

In some embodiments, the seat base frame channel may be an arcuate channel. The reversible passenger seat may further include an armrest adjacent to the seat bottom. The armrest may include a reversible tray table. The reversible tray table may be deployable from a stowed position to a first position or a second position. The first position may provide a tray table surface for the reversible passenger seat when the reversible passenger seat is facing the first direction, and the second position may provide a tray table surface for the reversible passenger seat when the reversible passenger seat is facing the second direction.

The reversible tray table may include a pivot, and the pivot of the tray table may be moveable from a first position to a second position. The pivot may be in the first position when the reversible tray table is deployed to the first position, and the pivot may be in the second position when the reversible tray table is deployed to the second position.

The reversible tray table may include a rail between the first position and the second position. The pivot may slide along the rail to move between the first position and the second position.

In some embodiments, a reversible passenger seat may include a tray table, and the tray table may be deployable from a stowed position to a first position and a second position. The first position may provide a tray table surface for the reversible passenger seat when the reversible passenger seat is facing the first direction. The tray table may include one or more engagement features for coupling with another deployed tray table.

In certain embodiments, a reversible passenger seat is provided that may include a seat backrest coupled with a seat base frame via a linkage. The linkage may include an upper link and a lower link. The upper link may couple with the seat base frame at an upper pivot and the lower link may couple with the seat base frame at a lower pivot. Optionally, at least one of the pivots is translatable in the horizontal direction relative to the seat base frame along a channel in the seat base frame.

In some embodiments, the channel may be arcuate. Optionally, at least one of the pivots may be translatable in the vertical direction relative to the seat base frame along a vertical channel in the seat base frame. A distance between the pivots may be adjustable and adjustment of the distance may adjust a seat backrest reclining angle relative to the seat base frame.

The invention will be better understood on reading the following description and examining the figures that accompany it. These figures are provided by way of illustration only and are in no way limiting on the invention.

BRIEF DESCRIPTION OF THE DRAWINGS

FIGS. 1A-1C illustrate an exemplary reversible passenger seat according to certain aspects of the present invention;

FIGS. 3A-3C illustrate the transition of the exemplary reversible passenger seat from a first configuration to a second configuration according to some aspects of the present invention;

FIGS. 5A-5C illustrate exemplary embodiments where the upper pivot may be moved in an arcuate channel and where the lower pivot may be moved in a vertical channel according to some embodiments of the present invention;

FIGS. 6A-6B illustrate an exemplary method and device for selectively reclining the reversible passenger seat according to some embodiments of the invention;

FIG. 12 illustrates an exemplary reversible tray table according to some embodiments of the invention;

FIG. 13 illustrates an exemplary moveable pivot mechanism according to some embodiments of the present invention;

FIG. 17, illustrates an exemplary system of the present invention and the combination of tray tables according to some aspects of the invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Some embodiments of the invention allow passengers to orient their seating in accord with the size of the group they may be traveling with and the activities they may have planned during the course of the flight. Accordingly, some embodiments of the invention, promote a shared experience and facilitate a range of activities between passengers who may be traveling together for business purposes, as a group of friends, or as a family. What was formerly a flight to a destination can now be an integral and functional part of the event itself. The journey now contributes to the range of memories created. Work can be accomplished, meetings held, meals shared, or games played face-to-face. Thus, some embodiments of the invention allow passengers to be more engaged with each other, see body language, receive a smile, or share the intensity of the moment and experience it more directly.

In some embodiments of the present invention, a passenger seat is provided that utilizes existing standard pitch dimensions for multiple seating classes, in combination with a proprietary reconfiguration mechanism that allows passengers to maintain an acceptable knee clearance regardless of the seat's orientation. According to some embodiments, a passenger seat may reverse position of the backrest in a way that maintains passenger density (number of passengers per class), while providing appropriate levels of comfort and respect for current social norms related to personal space. Advantageously, by allowing passengers to create group spaces and tailor seating configurations to the needs of the group rather than those of the individual, the operator may open up new marketing opportunities. Families and business persons may be able to spend the travelling time more productively. For example, business persons may be able to conduct meetings on a flight.

Figure 1A:
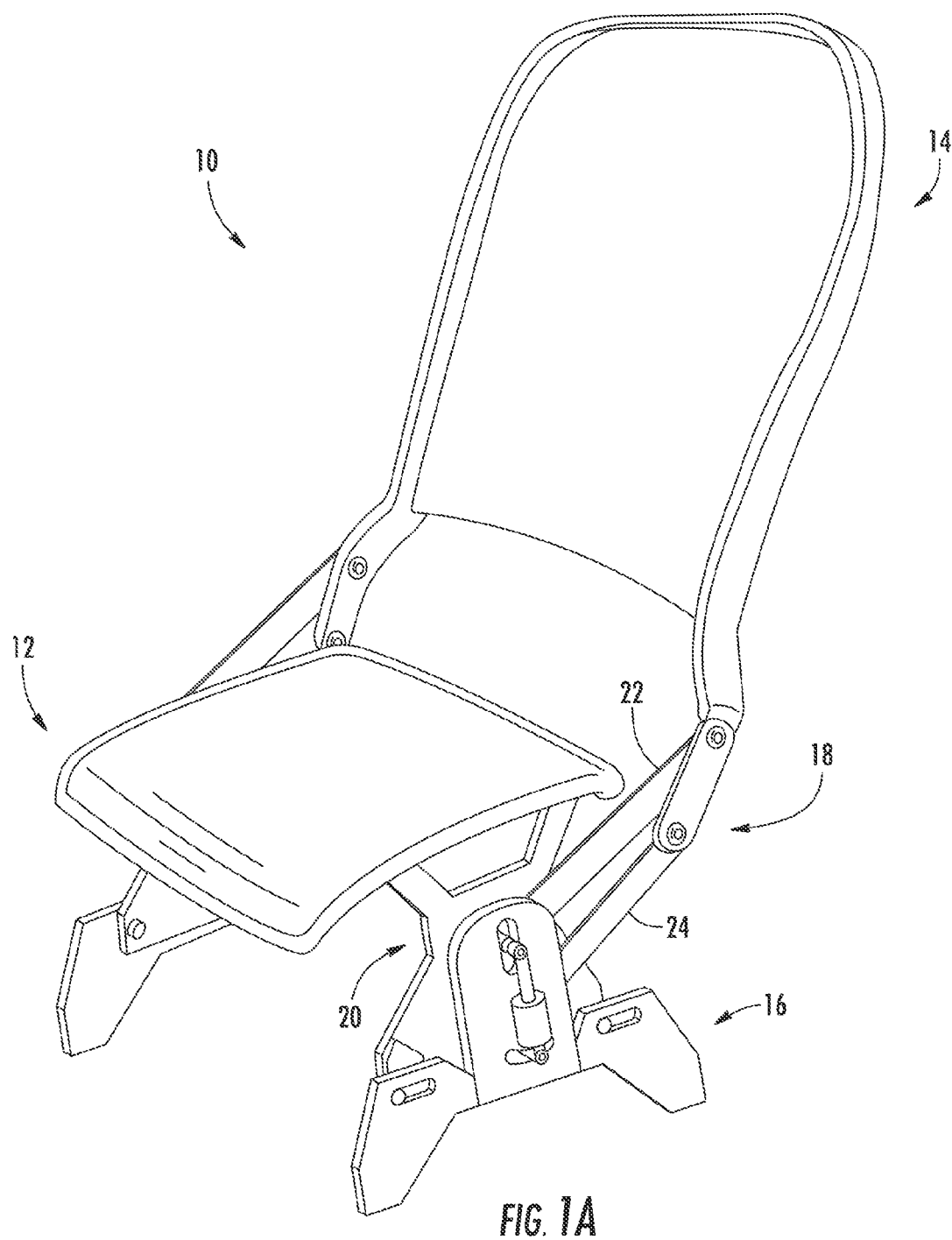

FIGS. 1A-1C illustrate an exemplary reversible passenger seat 10 according to certain aspects of the present invention. Passenger seat 10 may include a seat bottom 12, a seat backrest 14, and a seat base frame 16. Seat backrest 14 may couple with seat base frame 16 via linkage 18. Linkage 18 may rotatably couple seat backrest 14 relative to seat base frame 16.

As illustrated, seat backrest 14 may rotatably couple with seat base frame 16 via a linkage 18 that includes an upper link 22 and a lower link 24. Together, seat backrest 14, seat base frame 16, and linkage 18 may define a parallelogram. The upper link 22 may couple with the seat base frame 16 at an upper pivot 26. The lower link 24 may couple with the seat base frame 18 at a lower pivot 28.

Seat bottom 12 may couple with seat base frame 16 via seat spreader 20. Further, seat spreader 20 may slideably couple seat bottom 12 relative to seat base frame 16. In some embodiments, seat bottom 12 may also couple with linkage 18. The details of such slideable coupling may be further illustrated in FIG. 2, as discussed below.

Passenger seat 10 may have a first configuration and a second configuration as shown in FIGS. 1B-1C. The configuration of passenger seat 10 in FIG. 1B may represent a first configuration 30 and the configuration of passenger seat 10 in FIG. 1C may represent a second configuration 32. The first configuration 30 may face a first direction 31 and may be for example, a backward facing configuration. The second configuration 32 may face a second direction 33 that is opposite the first direction 31 and may be for example, a forward facing configuration.

Accordingly, in some embodiments, passenger seat 10 may provide a forward facing passenger seat and may be reconfigured to provide a backward facing passenger seat when desired. In some embodiments, passenger seats in adjacent rows may be reconfigured so as to face one another. Further, with adjacent rows of multiple passenger seats, some or all passenger seats in the row may be reconfigured to face the passenger seats in the adjacent row. Accordingly, some embodiments may provide group seating for two, three, four, five, or more passengers, thereby allowing passengers to easily face one another.

Figure 2:
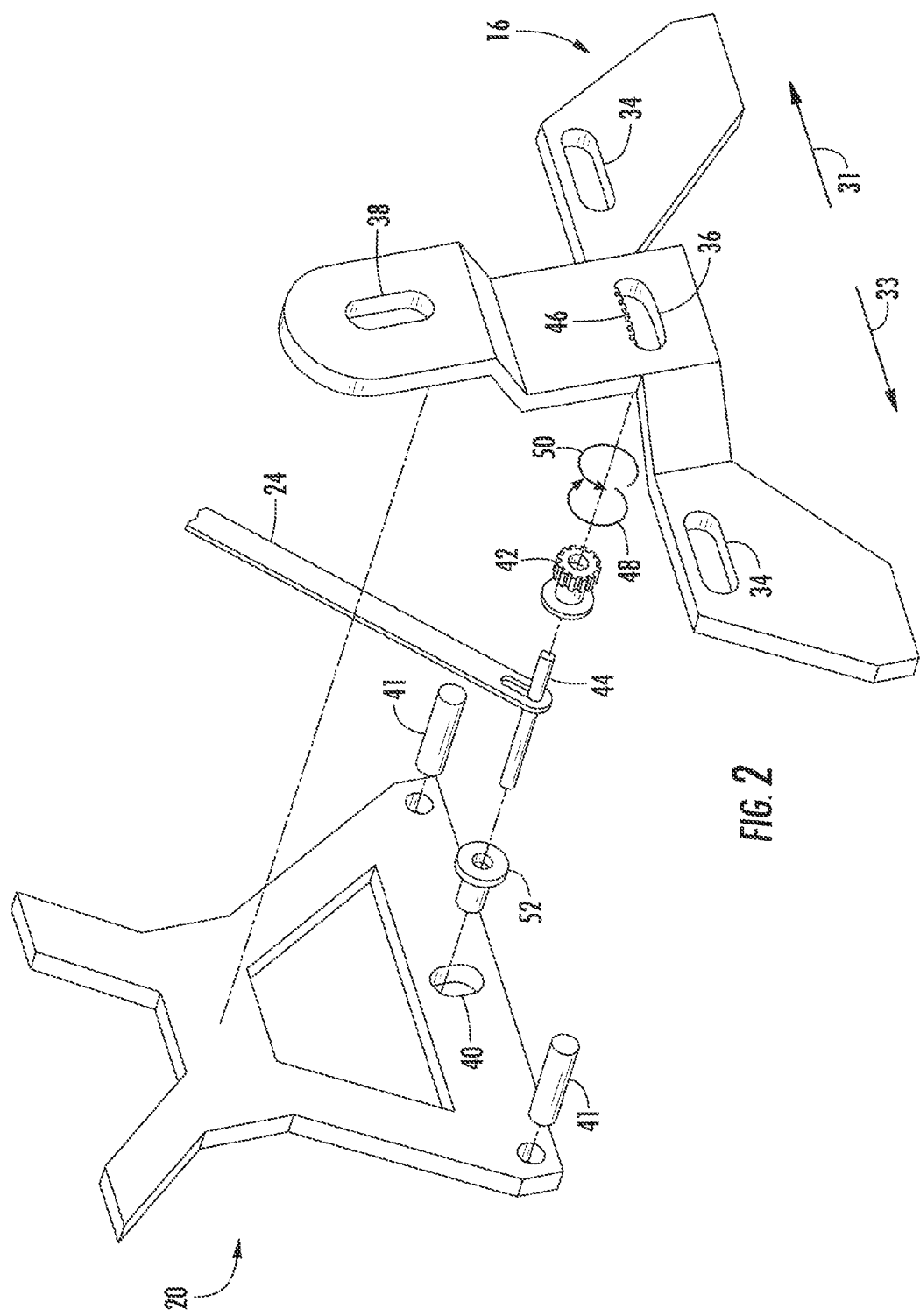
FIG. 2 illustrated an exploded view of the interconnections of the seat base frame, the seat spreader, and the linkage according to some embodiments of the invention.

FIG. 2 illustrates an exploded view of an exemplary coupling of a seat base frame 16, linkage 18, and seat spreader 20, according to some embodiments of the invention. As illustrated, seat base frame 16 may include a plurality of channels for coupling to linkage 18 and seat spreader 20. Channels 34 may couple with seat spreader 20. Channel 36 may couple with lower link 24 of linkage 18. Channel 38 may couple with upper link 22 of linkage 18. Further, seat spreader 20 may also include a channel 40 for coupling with lower link 24 of linkage 18.

In some embodiments, each channel 34 may be a horizontal slot for engaging a bearing 41 of seat spreader 20. When engaged with channel 34, bearing 41 may slide in a first direction 31 or a second direction 33 within channel 34. Accordingly, when seat spreader 20 couples with seat base frame 16, channels 34 may be configured so as to allow horizontal movement between seat spreader 20 and seat base frame 16. While seat base frame 16 is illustrated with two channels 34, it should be understood that one, three, four or more channels 34 may be used for coupling with seat spreader 20. Further, while bearings 41 are illustrated as generally cylindrical bearings, other bearing configurations are possible. Additionally, in some embodiments, the channels 34 may be part of seat spreader 20 and the bearings 41 may be part of seat base frame 16.

Channel 36 of seat base frame 16 may have an arcuate configuration and may provide a slot for engaging a geared piece 42 of lower link 24. As discussed above, the coupling of lower link 24 to seat base frame 16 may define lower pivot 28. When engaged with channel 36, geared piece 42/lower pivot 28 may move in the first direction 31 or the second direction 33 within channel 36. Lower link 24 may rigidly couple with geared piece 42 via pivot shaft 44. In some embodiments, lower link 24 may be coupled with lower pivot shaft 44 so that lower link 24 and lower pivot shaft 34 cannot rotate independently. For example, in the illustrated embodiment, lower link 24 may connect with pivot shaft 44 via a half circle hole in lower link 24.

Further, channel 36 may include teeth 46 for engaging with geared piece 42. In some embodiments, teeth 46 are disposed on an upper portion of channel 36. Accordingly, in some embodiments, as geared piece 42 moves through channel 36 in the first direction 31 or second direction 33, geared piece 42 also rotates in a clockwise direction 48 or counter clockwise direction 50. With a rigidly coupled lower link 24, lower link 24 also rotates with the geared piece 42 as the geared piece 42 moves through channel 36 in the first direction 31 or the second direction 33. In the illustrated embodiment, as geared piece 42 moves across channel 36 in the first direction 31, geared piece 42 and lower link 24 also rotate in the counter clockwise direction 50. As geared piece 42 moves across channel 36 in the second direction 33, geared piece 42 and lower link 24 also rotate in the clockwise direction 48.

In some embodiments, channel 38 may provide a slot for engaging with upper link 22, as can be seen in FIGS. 1A-1C. As discussed above, the coupling of upper link 28 to seat base frame 16 may define upper pivot 26. Optionally, channel 38 may be configured as a vertical slot such that, when engaged with channel 38, upper pivot 26 may move in a vertical direction relative to seat base frame 16. Movement of the upper pivot 26 in the vertical direction relative to seat base frame 16 may adjust a reclining angle of seat backrest 14 as discussed further below with regard to FIGS. 6A-6B and FIGS. 7A-7B.

Channel 40 of seat spreader 20 may provide a slot for engaging with a bearing 52 of lower link 24. Bearing 52 may connect with the pivot shaft 44 on an end opposite geared piece 42. When engaged with channel 40, lower pivot 28 may be rigidly coupled with seat spreader 20 such that lower pivot 28 may move with seat spreader 20 when seat spreader 20 moves in the first direction 31 and the second direction 33. Optionally, the channel 40 may provide a vertical slot for engaging with bearing 52 of lower link 24. Accordingly, in some embodiments, when engaged with channel 40, bearing 52 may move in a vertical direction with respect to seat spreader 20. Such an embodiment may account for vertical displacement of the geared piece 42/lower pivot 28 as the geared piece 42 moves across arcuate channel 36 in the first direction 31 and the second direction 33.

FIGS. 3A-3C illustrate the transition of the exemplary reversible passenger seat 10 from a first configuration 30 to a second configuration 32, according to some aspects of the present invention. FIG. 3A illustrates reversible passenger seat 10 in the first configuration 30, and FIG. 3C illustrates reversible passenger seat 10 in the second configuration 32. FIG. 3B illustrates passenger seat 10 in an intermediate configuration between the first and second configurations 30, 32.

When passenger seat 10 is in the first configuration 30, seat backrest 14 of passenger seat 10 faces in the first direction 31. Seat bottom 12 may be positioned toward the first direction 31 relative to seat base frame 16. Accordingly, in some embodiments, bearings 41 of seat spreader 20 may be positioned toward the first direction 31 within channels 34 when passenger seat 10 is in the first configuration 30. Similarly, lower pivot 28/geared piece 42 may be positioned toward first direction 31 within channel 36.

Reversing the configuration of passenger seat 10 from the first configuration 30 to the second configuration 32 may be started by pushing the seat bottom 12 of seat 10 in second direction 33 relative to seat base frame 16, as shown in FIG. 3A. The bearings 41 may translate in the second direction 33 within channels 34 as the seat bottom 12 is moved in the second direction 33 relative to seat base frame 16. Further, since channel 40 of seat spreader 20 couples with bearing 52 of lower link 24, and since lower link 24 also couples with geared piece 42, geared piece 42 may also translate in the second direction 33 within channel 36 when seat bottom 12 is moved in the second direction 33 relative to seat base frame 16. Furthermore, since channel 36 includes teeth 46 that engage with geared piece 42, geared piece 42 may rotate in the clockwise direction 48 as the geared piece 42 moves through channel 36 in the second direction 33. As geared piece 42 rotates in the clockwise direction 48, linkage 18 rotates and translates seat backrest 14 from a first position toward an upright position as illustrated in FIG. 3B and finally to a second position as illustrated in FIG. 3C. Accordingly, in some embodiments, as seat base 12 is moved in the second direction 33 relative to seat base frame 16, linkage 18 may reposition seat backrest 14 from a first position facing the first direction 31 to a second position facing the second direction 33, thereby reconfiguring passenger seat 10 from a first configuration 30 to a second configuration 32.

In order to reconfigure passenger seat 10 from the second configuration 32 (as illustrated in FIG. 3C) to the first configuration 30 (as illustrated in FIG. 3A), the seat bottom 12 may be moved in the first direction 31 relative to the seat base frame 16. The bearings 41 may translate in the first direction 31 within channels 34 as the seat bottom 12 is moved in the first direction 31 relative to seat base frame 16. Further, geared piece 42 may also translate in the first direction 31 within channel 36 when seat bottom 12 is moved in the first direction 31 relative to seat base frame 16. As geared piece 42 moves in the first direction 31 within channel 36, the teeth 46 rotate geared piece 42 in the counter clockwise direction 50. As geared piece 42 rotates in the counter clockwise direction 50, linkage 18 rotates and translates seat backrest 14 from the second position facing the second direction 33 toward the upright position illustrated in FIG. 3B and finally to the first reclined position (as illustrated in FIG. 3A). Accordingly, in some embodiments, as seat base 12 moves in the first direction 31 relative to seat base frame 16, backrest 14 may move in the second direction 33.

While the illustrated embodiments are described in detail, other embodiments and configurations are possible. For example, while lower link 24 may connect with pivot shaft 44 via a half circle hole in the lower link 24, other rigid engagement methods are possible. In some embodiments, the lower link 24 may engage with pivot shaft 44 via set screwed, different tube profiles (e.g., square, cut-circle, etc.), or even welding.

Figure 4A:
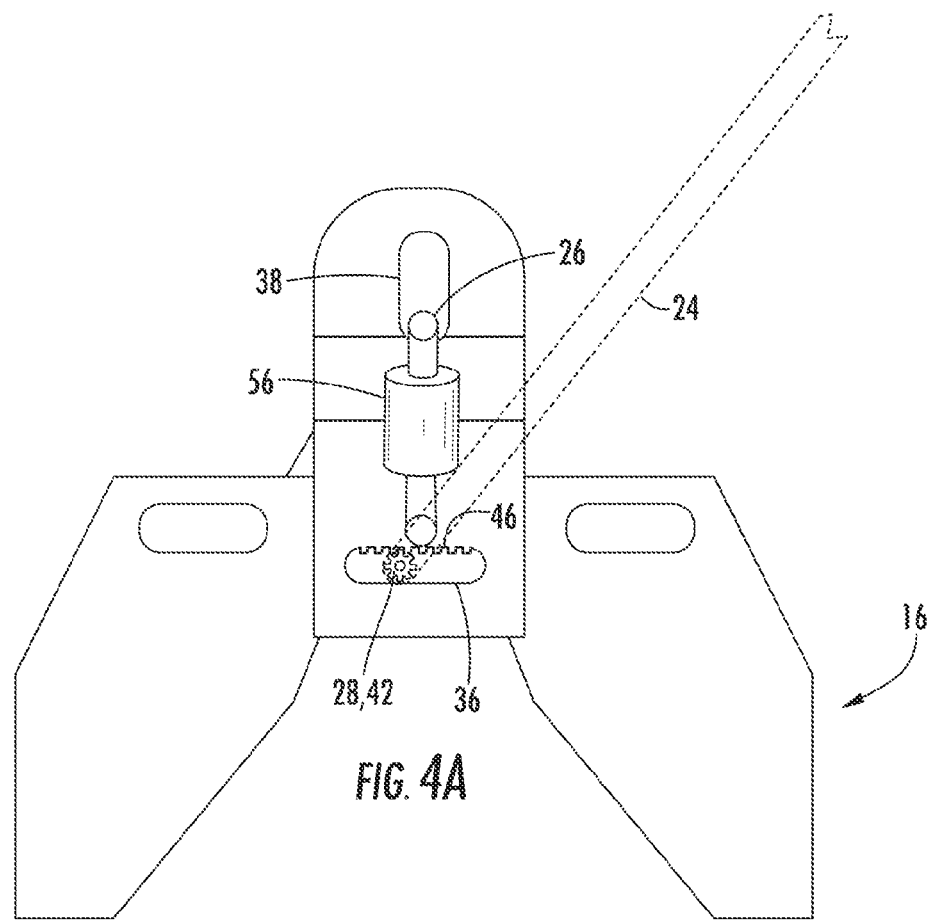
FIGS. 4A-4B illustrate exemplary embodiments where a horizontal channel may be used in place of an arcuate channel according to some embodiments of the present invention.
Figure 4B:
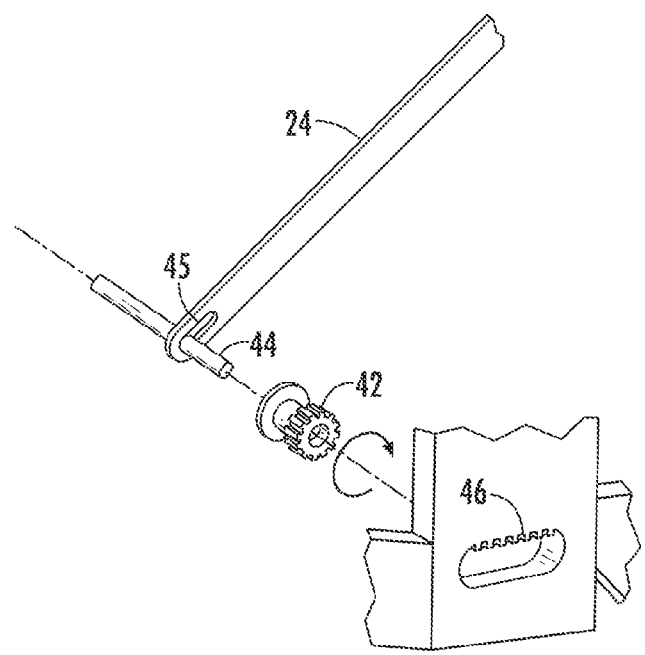

Further, while channel 36 is illustrated having an arcuate configuration, other configurations are possible. In some embodiments, channel 36 may be horizontal as illustrated in FIGS. 4A and 4B. In such an embodiment, the lower link 24 may include a cut 45 along the length of lower link 24 so as to compensate for horizontal movement of lower pivot 28. Similarly, some embodiments may have teeth 46 on a lower portion of channel 36. In such an embodiment, as geared piece 42 moves across channel 36 in the first direction 31, geared piece 42 and lower link 24 may rotate in the clockwise direction 48. Further, as geared piece 42 moves across channel 36 in the second direction 33, geared piece 42 and lower link 24 may rotate in the counter clockwise direction 50.

Further, in some embodiments, the functionality of channel 36 and channel 38 may be switched as illustrated in FIGS. 5A-5C. For example, channel 38 may provide a slot for engaging with a geared piece of the upper link 22 and the upper link 22 may be coupled with seat spreader 20. In such an embodiment, channel 38 may also include corresponding teeth 46 and the geared piece of upper link 22 may translate and rotate within channel 38 so as to translate and rotate upper link 22. Accordingly, in some embodiments, channel 36 may be configured so as to fix a lower pivot 28 horizontally in the first directions 31 and second directions 33 relative to seat base frame 16. Further as can be seen in FIGS. 5A-5C, in some embodiments, as seat bottom 12 moves in the first direction 31, upper pivot 26 may rotate in a clockwise direction and may reposition seat backrest 14 from a first position facing the first direction 31 toward an upright position as illustrated in FIG. 5B and finally to a second position as illustrated in FIG. 5C where the seat backrest 14 faces the second direction 33. To return to the first position facing the first direction 31 from the second position illustrated in FIG. 5C, seat bottom 12 may be moved in the second direction 33 relative to seat base frame 16. During seat bottom 12 movement in the second direction, upper pivot 26 may rotate in the counter clockwise direction and may reposition seat backrest 14 from the second position facing the second direction 33 toward the upright position and finally to the first position as illustrated in FIG. 5A.

Preferably, the passenger seat 10 reclines at an initial angle when in the first configuration 30 and the second configuration 32 so as to better support a seated passenger's back. This may be achieved by the movement of the lower pivot 28 in the first direction 31 or the second direction 33. When seat backrest 14 changes its orientation, the lower pivot 28 may be displaced in a direction opposite to the movement of the seat backrest 14. The opposite movement of lower pivot 28 may pull the lower link 24 to provide a desired seat backrest 14 reclining angle when in the first configuration 30 and the second configuration 32. Further, in some embodiments, the reclining angle of seat backrest 14 may be adjusted.

FIGS. 6A-6B illustrate an exemplary method and device for selectively reclining the reversible passenger seat 10 according to some embodiments of the invention. In some embodiments, to adjust the reclining of seat 10, there may be a piston 56 coupled between upper pivot 26 and lower pivot 28. Piston 56 may adjust a length between upper pivot 26 and lower pivot 28. As discussed above, channel 38 may be configured to allow vertical movement of upper pivot 26. Accordingly, channel 38 may accommodate changes in length between upper pivot 26 and lower pivot 28. As the piston 56 changes the length between upper pivot 26 and lower pivot 28, a side of the parallelogram created by the seat backrest 14, linkage 18 and seat base frame 16 changes length and thereby changes a reclining angle of the seat backrest 14. In the illustrated embodiment, an increase in length between the upper pivot 26 and the lower pivot 28 may increase a reclining angle and a decrease in length may decrease a reclining angle. Accordingly, piston 56 may adjust the length between upper pivot 26 and lower pivot 28 so as to adjust a reclining angle when the seat 10 is in either the first configuration 30 or the second configuration 32.

Figure 7A:
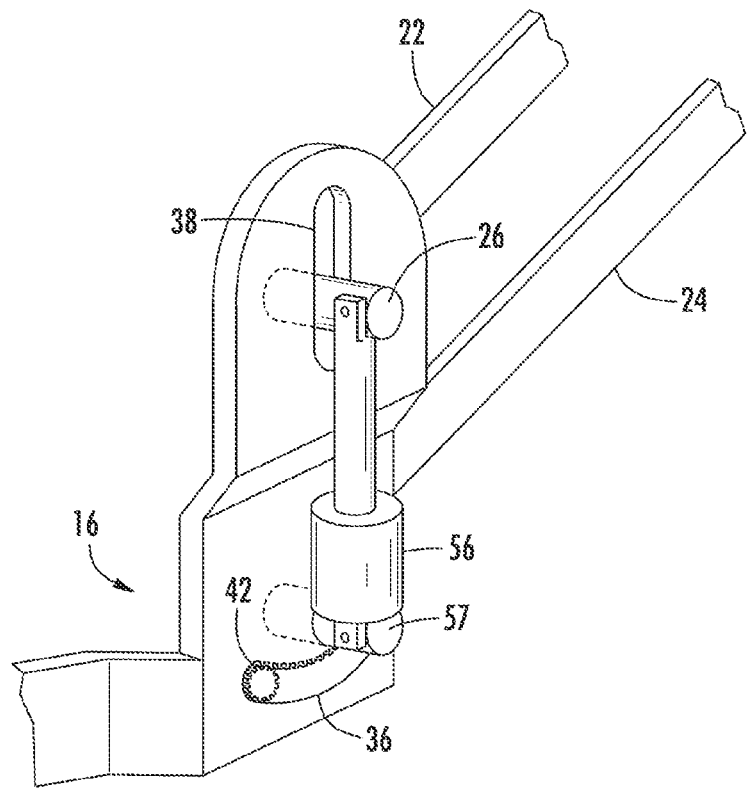
FIGS. 7A-7B illustrate exemplary embodiments where the piston couples an upper pivot with a fixed point on the seat base frame and may not couple with the lower pivot according to some embodiments of the present invention.
Figure 7B:
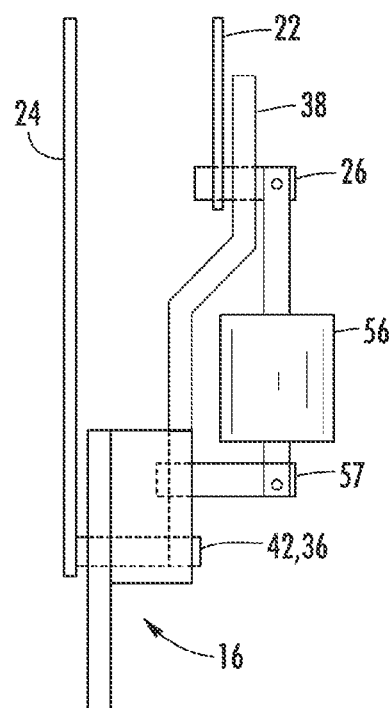

FIGS. 7A-7B illustrate an alternative engagement method for piston 56 according to some embodiments of the invention. In the illustrated embodiment, piston 56 may couple upper pivot 26 with a fixed portion of seat base frame 16. The fixed portion may be a fixed shaft 57, for example. Lower link 24 may couple with geared piece 42 that rotates in arcuate channel 36. Accordingly, in some embodiments, upper pivot 26 and lower pivot 28 may not be linked via piston 56. Similar to the embodiment illustrated in FIGS. 6A-6B however, piston 56 may adjust a height of upper pivot 26 relative to seat base frame 16 and may thereby adjust a reclining angle of the seat 10. In this assembly may minimize horizontal wear of the components involved.

Figure 8:
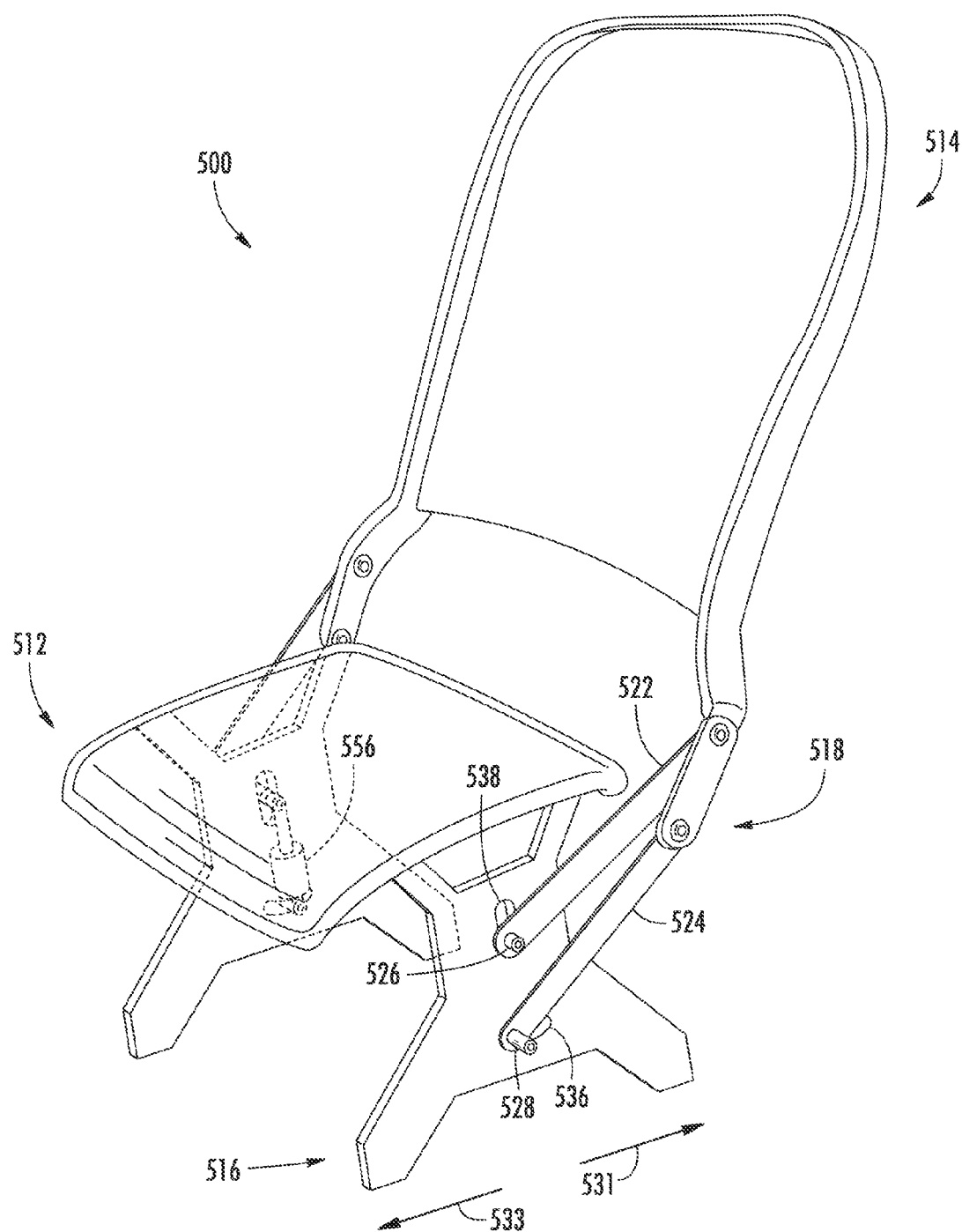
FIG. 8 illustrates an exemplary embodiment where the seat backrest may be moved independent of the seat bottom according to some embodiments of the invention.

FIG. 8 illustrates an exemplary passenger seat 500 where the seat backrest 514 may be reversed independently of the seat bottom 512 according to some embodiments of the invention. This alternative design may allow for a seat to be made with less parts and less movement between the parts, thus simplifying design, manufacture, and assembly. As illustrated, seat bottom 512 may be rigidly coupled with seat base frame 516. Seat backrest 514 and seat base frame 516 may be coupled via linkage 518. Linkage 518 may include an upper link 522 and a lower link 524. Seat base frame 516 may include a vertical channel 538 and an arcuate channel 536. The upper link 522 may couple with channel 538 at an upper pivot 526 and the lower link 524 may couple with channel 536 at a lower pivot 528. The seat backrest 514 may be reversed by moving the seat backrest 514 in the first direction 531 or the second direction 533 relative to the seat base frame 516. As the seat backrest 514 moves in the second direction 533, the lower pivot 528 may move in the first direction 531. As the seat backrest 514 moves in the first direction 531, the lower pivot 528 may move in the second direction 533. In some embodiments, arcuate channel 536 may include teeth and the lower link 524 may couple with the channel 536 via a geared piece. Accordingly, in some embodiments, as the lower pivot 528 moves through the channel 536 in the second direction 533, the lower pivot 528 and lower link 524 may rotate in a counter clockwise direction. As the lower pivot 528 moves through the channel 536 in the first direction, the lower pivot 528 and lower link 524 may rotate in a clockwise direction. Furthermore, the illustrated embodiment may include a piston 556 for adjusting the reclining angle of the seat 500. The piston 556 may couple the upper pivot 526 with the lower pivot 524 similar to the embodiment illustrated in FIGS. 6A-6B. Alternatively, a piston 556 may couple the upper pivot 526 with a fixed portion of the seat base frame 516 similar to the embodiment illustrated in FIGS. 7A-7B.

Figure 9:
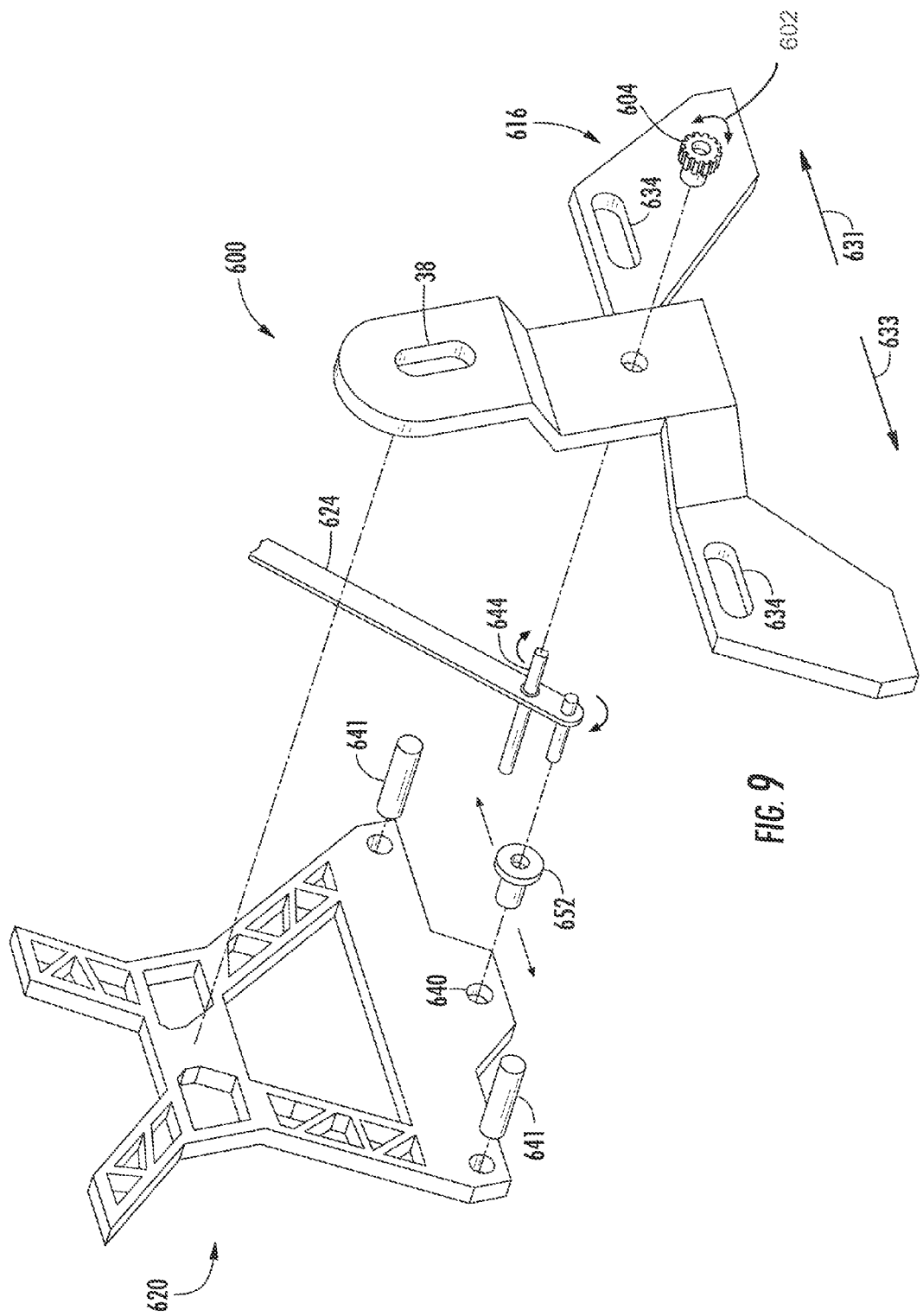
FIG. 9 illustrates an exemplary embodiment where the seat backrest may be operatively coupled with the seat bottom and where both may be moved with an external input according to some embodiments of the invention.

FIG. 9 illustrates an exemplary embodiment 600 where the seat backrest may be operatively coupled with the seat bottom and where both may be moved with an external input 602 according to some embodiments of the invention. In the illustrated drawing, an alternative deployment method is provided which may be actuated by an electric motor, for example. An external input 602, such as an electric motor, may rotate a gear or another type of receiver 604 that is rigidly coupled with lower link 624 via a pivot shaft 644. The external input 602 may thus reverse a seat backrest coupled with the lower link 624 directly between a first position and a second position (e.g., forward facing and backward facing orientation) relative to seat base frame 616. In some embodiments, seat base frame 616 may couple with bearings 641 of seat spreader 620 via channels 634. Further, lower link 624 may also couple with a channel 640 of seat spreader 620 via a bearing 652. The bearing 652 of lower link 624 may be positioned offset from pivot shaft 644. For example, bearing 652 may be positioned distally relative to pivot shaft 644. Accordingly, in some embodiments, rotational of lower link 624 about pivot shaft 644 may result in horizontal displacement of bearing 652 in the first direction 631 and second direction 633. Hence, the seat spreader 620 and a coupled seat bottom may also horizontally move as lower link 624 rotates between a first position and a second position. In some embodiments, one or more channels 634 may be arcuate or channel 640 may be a vertical channel to account for vertical movement of bearing 652.

Figure 10A:
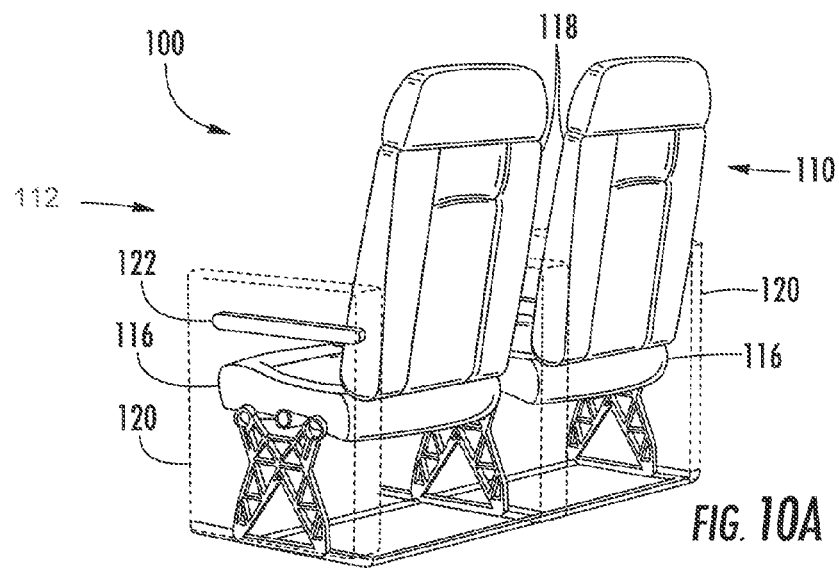
FIGS. 10A-10C illustrate an exemplary system according to some aspects of the invention and the transition of one reversible passenger seat from a first configuration to a second configuration.
Figure 10B:
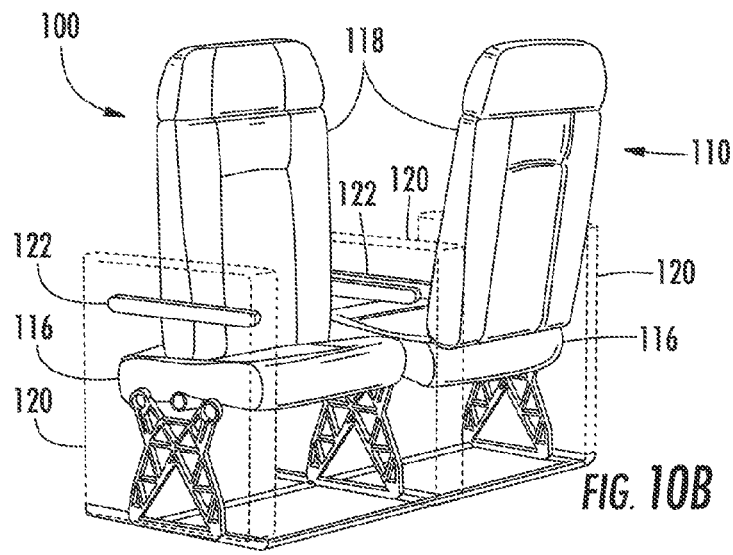
Figure 10C:
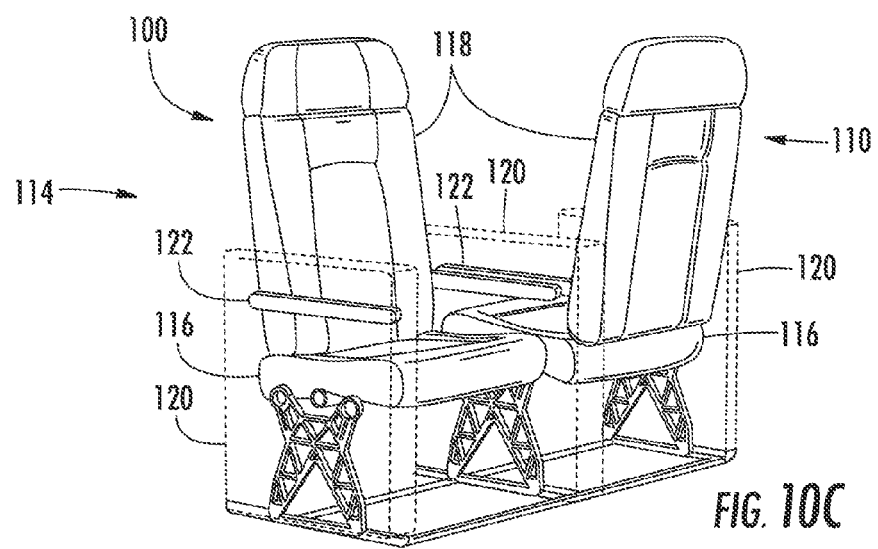

FIGS. 10A-10C illustrate an exemplary system 100 according to some aspects of the invention and the transition of one reversible passenger seat 110 from a first configuration 112 to a second configuration 114. System 100 illustrates a row of two passenger seats 110. Passenger seats 110 may include seat bottom 116 and seat backrest 118. Passenger seats 110 may include armrests 120 on both sides of passenger seats 110 and between passenger seats 110. Armrests 120 may include a track 122 for coupling with seat backrests 118. Accordingly, in some embodiments, passenger seat 110 may be reconfigured from the first configuration 112 to the second configuration 114 by translating passenger seat backrest 118 along tracks 122 toward the second configuration 114.

While system 100 was illustrated with two passenger seats 110, it should be understood that system 100 may include one, three, four or more passenger seats 110. Further, while passenger seat 110 is illustrated as translating along one track 122 on either side, it should be understood that passenger seats 110 may translate along a plurality of tracks 122. Alternatively, passenger seats 110 may be configured similar to one or more of the embodiments illustrated in FIGS. 1-9. Further, some embodiments may include variable privacy partitions or curtains, Wi-Fi enabled digital table tops with character recognition software, reversible luggage restraints, and extendable lower leg supports. In some embodiments, one or more tray tables may be stowed within armrests 120. Optionally, the tray tables may be reversible, such as the exemplary tray tables discussed further below with respect to FIGS. 7-16D.

Figure 11A:
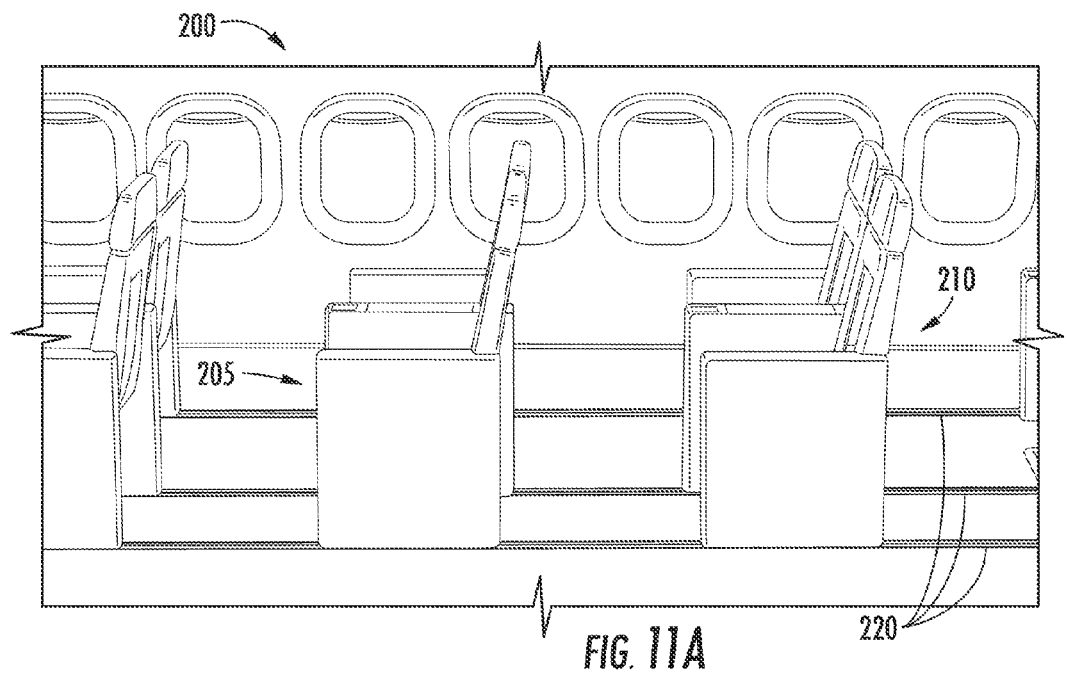
FIGS. 11A-11B illustrate an adjustment of a pitch between adjacent rows of seats according to some embodiments of the invention.
Figure 11B:
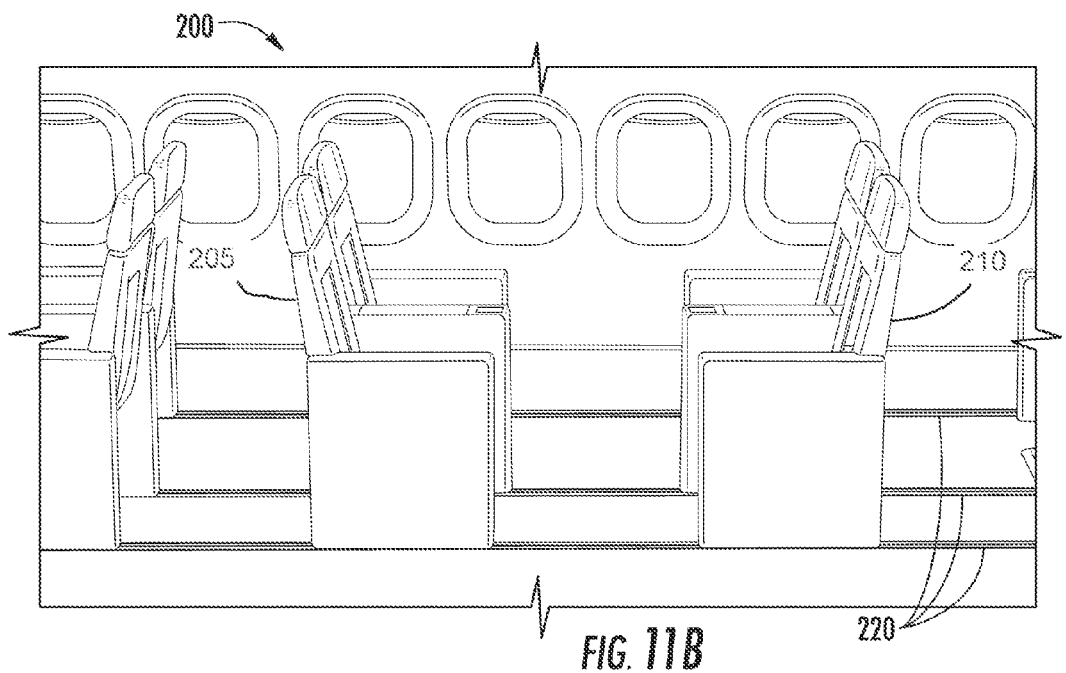

FIGS. 11A-11B illustrate an adjustment of a pitch between adjacent rows of seat system 200 according to some embodiments of the invention. In some embodiments, a pitch between adjacent rows of seats may be adjusted when leg room is lost due to reconfiguration of a seat from a first configuration to a second configuration. When two seats face one another, additional leg room may be desired in order to seat passengers comfortably facing one another. FIG. 11A illustrates a first row of seats 205 and a second row of seats 210 where all of the seats are in a forward facing configuration. In FIG. 11A, the pitch between rows may be 46 inches. FIG. 11B illustrates the first row of seats 205 reconfigured from the forward facing configuration to a backward facing configuration and the second row of seats 210 in the forward facing configuration. In FIG. 11A, the first and second row of seats 205, 210 may be coupled to tracks 220 that run along the floor of a cabin. Row 205 or row 210 may be displaced forward or aft along the tracks in order to recover the lost leg room when the seat is reconfigured. Accordingly, as illustrated in FIG. 11B, the pitch between row 205 and row 210 may be adjusted to 51 inches when the seats of the rows face one another. The seats may then be secured on the track 220 once a desired pitch between rows is obtained.

FIG. 12 illustrates an exemplary tray table system 300 according to some embodiments of the invention. In some embodiments, it may be preferable to provide a food tray for a reversible seat that can work for either orientation of the reversible seat, whether the reversible seat is in a first orientation or a second orientation. For example, the tray table may deploy from a stowed position to a first deployed position so as to provide a food tray to a reversible seat in a forward facing orientation. When the reversible seat is reconfigured to a backward facing orientation, the tray table may deploy from the stowed position to a second deployed position so as to provide a food tray to the seat in the backward facing orientation.

Figure 16A:
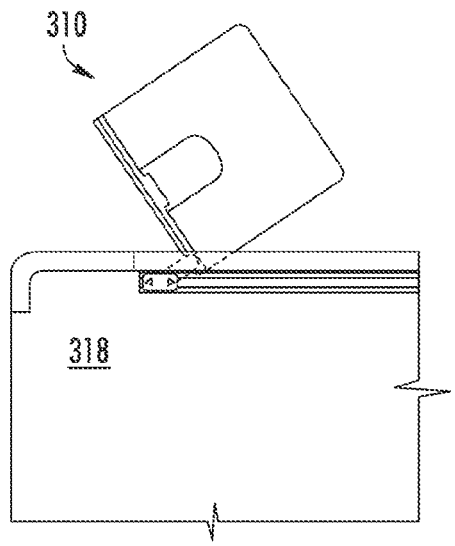
FIGS. 16A-16D illustrate the exemplary movement of an exemplary reversible tray table from a first position to a stowed position and to a second position according to some embodiments of the invention.
Figure 16B:
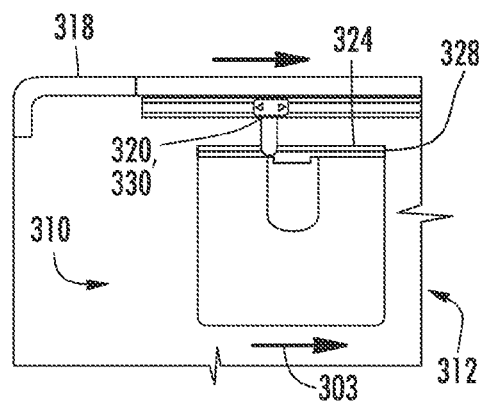
Figure 16C:
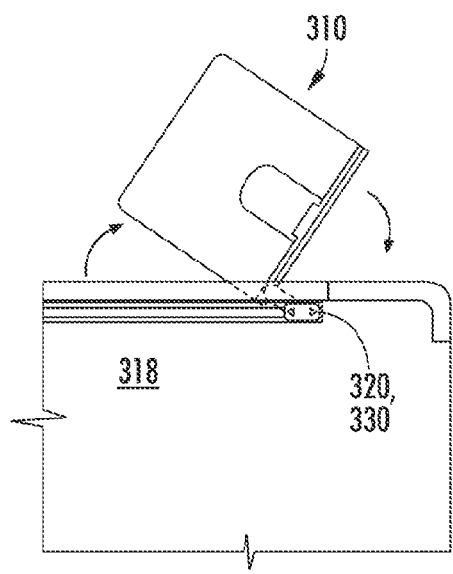
Figure 16D:
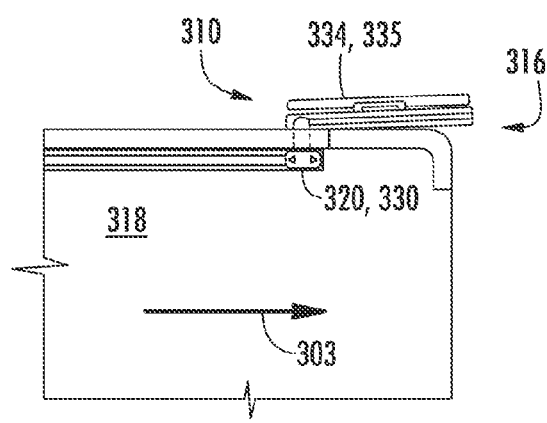

In the illustrated system 300, food tray table 310 may be moveable between a stowed position 312 and a first deployed position 314 and may be moveable between the stowed position 312 to a second deployed position 316 (illustrated for example in FIG. 16D). The tray table 310 may be moved to the stowed position 312 when the tray table 310 is not in use. In some embodiments, the tray table 310 may stow within an armrest 318. The first deployed position 314 may extend tray table 310 toward a first direction 301 and may provide a tray table for a seated passenger when the seat is in a first orientation (e.g., forward facing orientation). The second deployed position 316 may extend tray table 310 toward a second direction 303 and may provide a tray table for a seated passenger when the seat is in a second orientation (e.g., backward facing orientation).

Tray table 310 may include a pivot 320 for rotating the tray table 310 between the stowed position 312 and the first deployed position 314 and second deployed position 316. In some embodiments, the pivot 320 may be relocated along an edge 322 of tray table 310. In some embodiments, pivot 320 may slide along rail 324. When deploying to the first deployed position 314, pivot 320 may be positioned at a first end 326 of rail 324. In such a position, tray table 310 may rotate in a counter clockwise direction when moving from the stowed position 312 toward the first deployed position 314. When deploying to the second deployed position 316, pivot 320 may be positioned at a second end 328 of rail 324. In such a position, tray table 310 may rotate in a clockwise direction when moving from the stowed position 312 toward the second deployed position 316. In some embodiments, the position of the pivot 320 along rail 324 may be controlled by a passenger by actuating an orientation control 330.

FIG. 13 illustrates an exemplary orientation control 330 according to some embodiments of the present invention. In some embodiments, an orientation control 330 may be coupled with pivot 320. Orientation control 330 may be actuated by a seated passenger when the tray table 310 is in the stowed position 312 within armrest 318. In some embodiments, a seated passenger may slide orientation control 330 in the first direction 301 or a second direction 303 in order to slide the tray table 310 and/or the pivot 320 in the desired position before deploying the tray table 310 to one of the deployed positions 314, 316.

Figure 14:
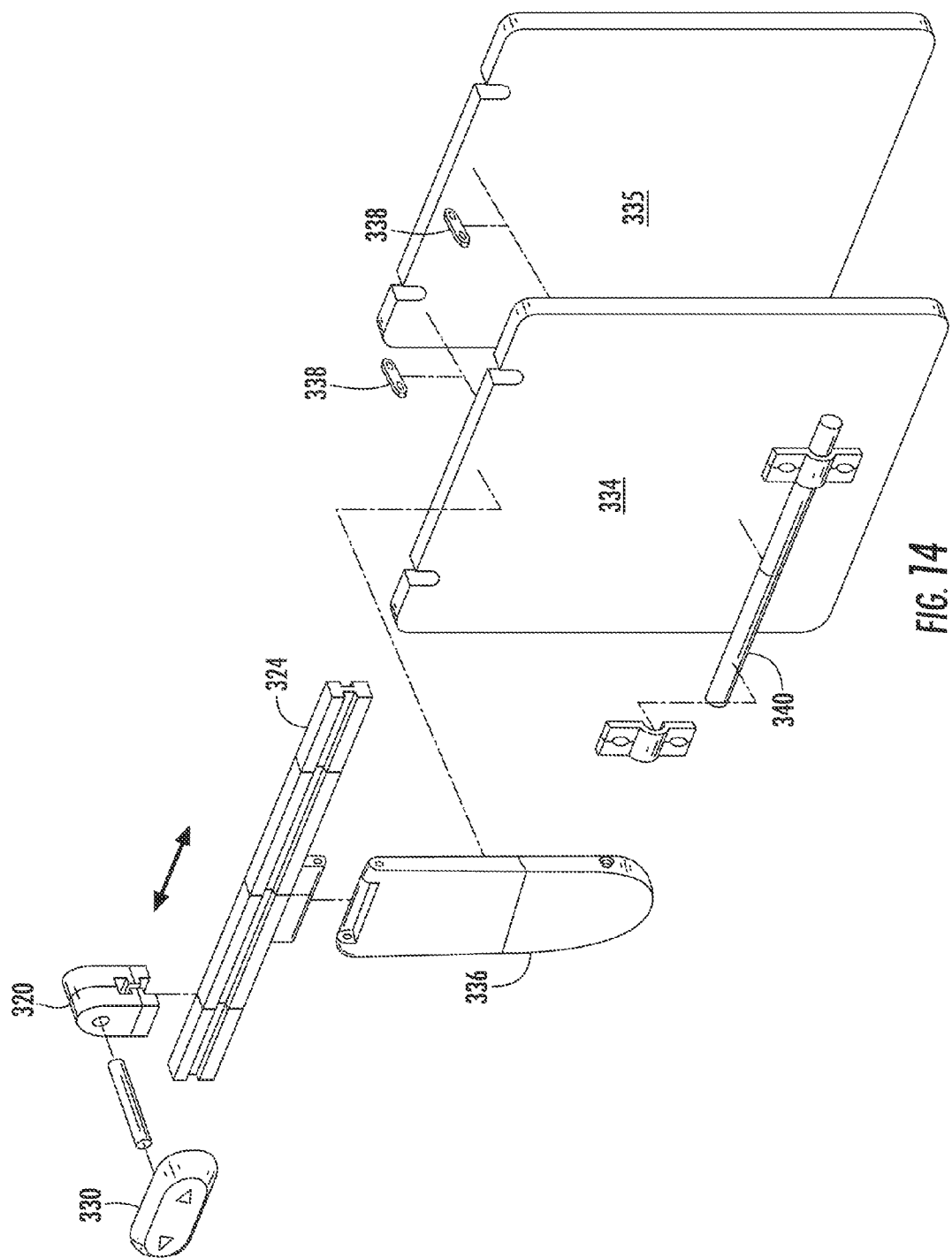
FIG. 14 illustrates an exploded view of components of the exemplary reversible tray table illustrated in FIG. 13.

FIG. 14 illustrates an exploded view of components of the exemplary reversible tray table 310 illustrated in FIG. 12. As discussed above, tray table 310 may include a repositionable pivot 320. In some embodiments, a passenger may slide pivot 320 along rail 324 using slide orientation control 330. Rail 324 may couple with one or more tray leafs 334, 335 via tray leaf support 336. Tray leaf support 336 may be rotatably coupled with rail 324 via a hinge mechanism. In some embodiments, tray leaf support 336 may slideably couple with a tray leaf 334. For example, tray leaf support 336 may receive a rod 340 of tray leaf 334 within a bore of tray leaf support 336. In such an embodiment, tray leaf 334 may slide relative to tray leaf support 336. In some embodiments, tray leaf 334 may couple with an additional tray leaf 335. Tray leaf 335 may be coupled with tray leaf 334 via linkage 338. Linkage 338 may allow tray leaf 335 to deploy to a position adjacent to and flush with tray leaf 334 so as to provide a larger usable tray table surface.

Figure 15A:
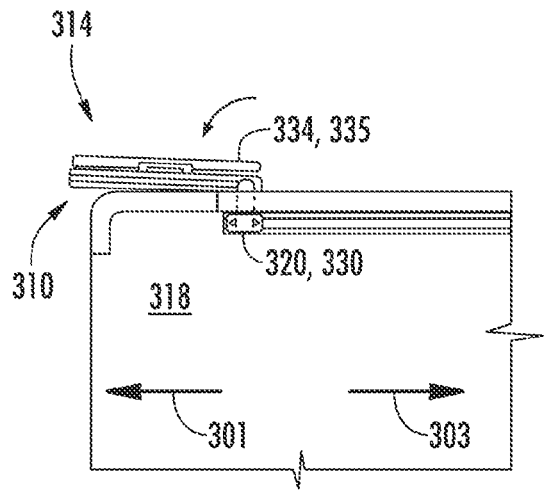
FIGS. 15A-15C illustrate the exemplary deployment of a reversible tray table according to some embodiments of the invention.
Figure 15B:
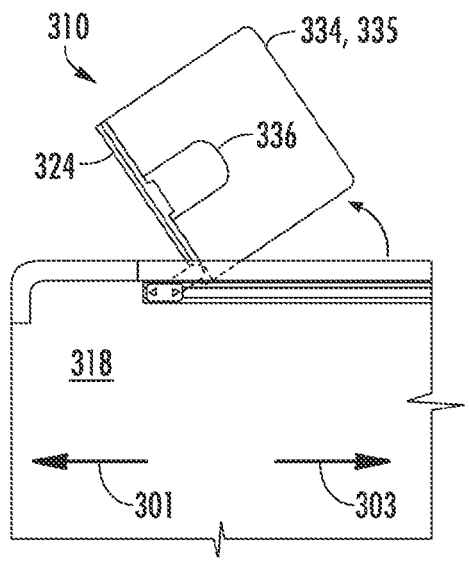
Figure 15C:
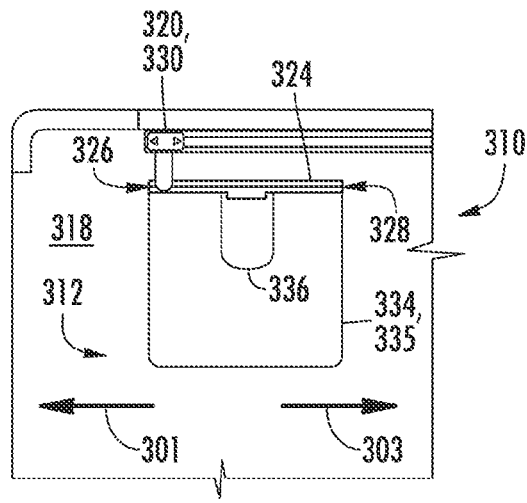

FIGS. 15A-15C illustrate the exemplary deployment of a reversible tray table 310 according to some embodiments of the invention. When pivot 320 is positioned at the first end 326 of rail 324, tray table 310 may rotate in the counter clockwise direction from the stowed position 312 within the armrest 318 toward the first deployed position 314. In such an orientation, tray table 310 may extend in the first direction 301 and provide a usable tray table when the passenger seat is configured to face the first direction 301. Thereafter, tray leafs 334, 335 may deploy to provide a horizontal surface for use by a seated passenger.

FIGS. 16A-16D illustrate the movement of an exemplary reversible tray table 310 from a first position 314 to a second position 316 according to some embodiments of the invention. When reversing tray table 310 from a first position 314 to a second position 316, tray table 310 may be rotated in the clockwise direction back toward a stowed position 312. Once stowed, the pivot 320 and/or tray table 310 may be moved in the second direction 303. Once pivot 320 is at the second end 328 of rail 324, tray table 310 may be rotated in the clockwise direction from the stowed position 312 within the armrest 318 toward the second deployed position 316. In such an orientation, tray table 310 may extend in the second direction 303. Thereafter, tray leafs 334, 335 may similarly deploy to provide a horizontal surface for use by a seated passenger. Accordingly, some embodiments of the present invention may provide for a reversible passenger seat that is moveable between a first orientation and a second orientation. Further, the reversible passenger seat may include a reversible tray table that may provide a tray table surface for use by a seated passenger when the passenger seat is in either orientation.

FIG. 17, illustrates an exemplary system 400 according to some embodiments of the invention. System 400 may include adjacent passenger seat rows 410. The passenger seats 412 of rows 410 may be reversible passenger seats and may be reconfigurable between a forward facing orientation and a backward facing orientation. Accordingly, passenger seats 412 of rows 410 may be reconfigured to face one another. Further, in some embodiments, system 400 includes armrests 414 on the either side of the passenger seats 412. Armrests 414 may also include tray tables 416. Tray tables 416 may be reversible tray tables that provide a tray table surface when the passenger seat 412 is configured in a forward facing orientation or a tray table surface when passenger seat 412 is configured in a backward facing orientation. In some embodiments, tray tables 416 may be combinable with the tray tables 416 of an adjacent passenger seat 412. In some embodiments, tray tables 416 may be combinable with the tray tables 416 of passenger seats 412 in an adjacent row 410. In some embodiments, the tray tables may combine by abutting the edges of tray tables 412 and making the surfaces of tray tables 412 flush with one another. In some embodiments, tray tables 412 may include engagement features for coupling with an adjacent tray table 412. For example, tray tables 412 may include dovetail engagement features, magnetic engagement features, hook and loop engagement features, etc.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A reversible passenger seat, comprising:
a seat bottom operably coupled with a seat backrest;
the seat backrest moveable between a first position and a second position relative to the seat bottom;
the reversible passenger seat facing a first direction when the seat backrest is in the first position and the reversible passenger seat facing a second direction when the seat backrest is in the second position, the first direction being opposite the second direction; and
wherein the seat bottom is operably coupled with the seat backrest such that translational movement of the seat bottom in the first and second direction actuates the seat backrest between the first and the second positions; and
an armrest adjacent to the seat bottom, the armrest comprising a reversible tray table, the reversible tray table deployable from a stowed position to a first position or a second position, the first position providing a tray table surface for the reversible passenger seat when the reversible passenger seat is facing the first direction, and the second position providing a tray table surface for the reversible passenger seat when the reversible passenger seat is facing the second direction.

2. The reversible passenger seat of claim 1, wherein the seat bottom is operably coupled with the seat backrest such that translational movement in the first direction moves seat backrest to the first position and wherein translational movement of the seat bottom in the second direction moves the seat backrest to the second position.

3. The reversible passenger seat of claim 1, further comprising a seat base frame for supporting the reversible passenger seat above a surface, the seat bottom being slideably coupled with the seat base frame such that the seat bottom is moveable relative to the seat base frame in the first direction and the second direction.

4. The passenger seat of claim 3, wherein the seat base frame is coupled with the surface via tracks, and wherein the seat base frame is moveable in the first direction or the second direction along the tracks so as to adjust a pitch between the reversible passenger seat and another seat.

5. The reversible passenger seat of claim 3, wherein the seat bottom is slideably coupled with the seat base frame by coupling with a seat spreader, the seat spreader including one or more bearings that run along one or more channels in the seat base frame.

6. The reversible passenger seat of claim 3, wherein the seat base frame is coupled with the seat backrest through a linkage, the linkage moves the seat backrest between the first position and the second position relative to the seat base frame when the seat bottom moves in the first direction and the second direction.

7. The reversible passenger seat of claim 6, wherein the linkage comprises an upper link, the upper link being coupled with the seat base frame at an upper pivot, the upper pivot being fixed at least in the first direction and the second direction.

8. The reversible passenger seat of claim 7, wherein the upper pivot is moveable in the vertical direction, and wherein movement of the upper pivot in the vertical direction adjusts a reclining angle of the seat backrest.

9. The reversible passenger seat of claim 8, wherein the upper pivot couples with a vertical channel in the seat base frame.

10. A reversible passenger seat, comprising:
a seat bottom operably coupled with a seat backrest;
the seat backrest moveable between a first position and a second position relative to the seat bottom;
the reversible passenger seat facing a first direction when the seat backrest is in the first position and the reversible passenger seat facing a second direction when the seat backrest is in the second position, the first direction being opposite the second direction;
wherein the seat bottom is operably coupled with the seat backrest such that translational movement of the seat bottom in the first and second direction actuates the seat backrest between the first and the second positions; and
further comprising a seat base frame for supporting the reversible passenger seat above a surface, the seat bottom being slideably coupled with the seat base frame such that the seat bottom is moveable relative to the seat base frame in the first direction and the second direction;
wherein the seat base frame is coupled with the seat backrest through a linkage, the linkage moves the seat backrest between the first position and the second position relative to the seat base frame when the seat bottom moves in the first direction and the second direction;
wherein the linkage comprises an upper link, the upper link being coupled with the seat base frame at an upper pivot, the upper pivot being fixed at least in the first direction and the second direction;
wherein the upper pivot is moveable in the vertical direction, and wherein movement of the upper pivot in the vertical direction adjusts a reclining angle of the seat backrest; and
wherein the linkage further comprises a lower link, the lower link coupled with the seat base frame at a lower pivot, and wherein the lower pivot and the upper pivot are coupled to one another with a piston, the piston actuateable so as to adjust a distance between the upper pivot and the lower pivot, and wherein the distance between the upper pivot and the lower pivot adjusts the reclining angle of the seat backrest.

11. The reversible passenger seat of claim 6, wherein the linkage comprises a lower link, the lower link coupled with a geared piece having teeth, the geared piece coupling the lower link to the seat base frame and running along a seat base frame channel having corresponding teeth; and
wherein movement of the geared piece through the channel rotates the geared piece, and wherein rotation of the geared piece rotates the lower link and the seat backrest between the first position and the second position.

12. The reversible passenger seat of claim 6, wherein the seat base frame channel comprises an arcuate channel.

13. The reversible passenger seat of claim 1, wherein the reversible tray table includes a pivot, and wherein the pivot of the tray table is moveable from a first position to a second position; and wherein the pivot is in the first position when the reversible tray table is deployed to the first position, and wherein the pivot is in the second position when the reversible tray table is deployed to the second position.

14. The reversible passenger seat of claim 1, wherein the reversible tray table includes a rail between the first position and the second position, and wherein the pivot slides along the rail to move between the first position and the second position; and wherein the tray table deploys in a counter clockwise direction when deploying to the first position and deploys in a clockwise direction when deploying to the second position.

15. A reversible passenger seat, comprising:
a seat bottom operably coupled with a seat backrest;
the seat backrest moveable between a first position and a second position relative to the seat bottom;
the reversible passenger seat facing a first direction when the seat backrest is in the first position and the reversible passenger seat facing a second direction when the seat backrest is in the second position, the first direction being opposite the second direction;
wherein the seat bottom is operably coupled with the seat backrest such that translational movement of the seat bottom in the first and second direction actuates the seat backrest between the first and the second positions; and
a tray table, the tray table deployable from a stowed position to a first position, the first position providing a tray table surface for the reversible passenger seat when the reversible passenger seat is facing the first direction, and wherein the tray table includes one or more engagement features for coupling with another deployed tray table.

* * * * *